US012796722B2

(12) United States Patent
Inoue et al.

(10) Patent No.: US 12,796,722 B2
(45) Date of Patent: Nov. 17, 2026

(54) METHOD AND SYSTEM FOR PRODUCING PATTERNED LIQUID

(71) Applicant: SUNTORY HOLDINGS LIMITED, Osaka (JP)

(72) Inventors: Ippei Inoue, Soraku-gun (JP); Itsuo Hanasaki, Fuchu (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 260 days.

(21) Appl. No.: 18/685,375

(22) PCT Filed: Aug. 10, 2022

(86) PCT No.: PCT/JP2022/030519
§ 371 (c)(1),
(2) Date: Feb. 21, 2024

(87) PCT Pub. No.: WO2023/026862
PCT Pub. Date: Mar. 2, 2023

(65) Prior Publication Data
US 2024/0349772 A1 Oct. 24, 2024

(30) Foreign Application Priority Data
Aug. 23, 2021 (JP) ................................ 2021-135928

(51) Int. Cl.
*A23P 10/00* (2016.01)
*A23L 2/38* (2021.01)
*A23L 2/52* (2006.01)

(52) U.S. Cl.
CPC ................ *A23P 10/00* (2016.08); *A23L 2/38* (2013.01); *A23L 2/52* (2013.01)

(58) Field of Classification Search
CPC .... A23P 10/00; A23P 2020/253; A23P 20/00; A23P 30/00; A23L 2/38; A23L 2/52;
(Continued)

(56) References Cited

U.S. PATENT DOCUMENTS 6,103,160 A 8/2000 Uchida et al.
2007/0056637 A1 3/2007 Okubo et al.
(Continued)

FOREIGN PATENT DOCUMENTS

CN 1229021 A 9/1999
CN 101596430 A 12/2009
(Continued)

OTHER PUBLICATIONS

English translation of JP-2009207963-A by EPO. (Year: 2009).*
(Continued)

*Primary Examiner* — Inja Song
(74) *Attorney, Agent, or Firm* — WHDA, LLP

(57) ABSTRACT

The present invention aims to provide a method for producing a pattern-containing liquid and a system for producing a pattern-containing liquid each having a high flexibility in designing, in liquid, a pattern that can generate any sense such as color vision, taste, flavor, mouthfeel, or texture. The present invention relates to a method for producing a pattern-containing liquid, including discharging, using a position-controllable nozzle, a pattern-forming material in which first micro-sized particles containing a first edible organic substance are dispersed in a first liquid into a second liquid, thereby forming a pattern from the first micro-sized particles.

11 Claims, 10 Drawing Sheets

(58) Field of Classification Search
CPC ......... B33Y 10/00; B33Y 30/00; B33Y 70/00; B29C 64/106; B29C 64/112; B29C 64/204
See application file for complete search history.

(56) References Cited

U.S. PATENT DOCUMENTS

| | | | |
|---|---|---|---|
| 2008/0193725 A1 | 8/2008 | De Saint-Romain | |
| 2016/0067918 A1* | 3/2016 | Millar | B29C 64/106 425/375 |
| 2016/0167312 A1* | 6/2016 | Feinberg | A61L 27/54 264/239 |
| 2017/0189960 A1 | 7/2017 | Ibe | |
| 2018/0281295 A1* | 10/2018 | Tibbits | B29C 64/40 |
| 2020/0198251 A1* | 6/2020 | Huang | B29C 64/40 |
| 2020/0247053 A1 | 8/2020 | Rodriguez et al. | |
| 2020/0347199 A1 | 11/2020 | Oku et al. | |
| 2021/0138718 A1* | 5/2021 | Greimel | B29C 64/209 |
| 2021/0394391 A1* | 12/2021 | Minary-Jolandan | B33Y 80/00 |
| 2022/0379567 A1* | 12/2022 | Vier | B29C 64/209 |

FOREIGN PATENT DOCUMENTS

| | | | |
|---|---|---|---|
| CN | 105479751 A | | 4/2016 |
| CN | 106457668 A | | 2/2017 |
| CN | 111630092 A | | 9/2020 |
| CN | 111655835 A | | 9/2020 |
| JP | 6-46766 A | | 2/1994 |
| JP | 2009207963 A | * | 9/2009 |
| JP | 5472844 B2 | | 4/2014 |
| JP | 2020-512943 A | | 4/2020 |
| KR | 10-2019-0115497 A | | 10/2019 |
| TW | 201801997 A | | 1/2018 |
| WO | 2006/120227 A1 | | 11/2006 |
| WO | 2017/203306 A1 | | 11/2017 |
| WO | 2018/187514 A1 | | 10/2018 |
| WO | 2018/218264 A1 | | 12/2018 |
| WO | 2019/038453 A1 | | 2/2019 |

OTHER PUBLICATIONS

Evonik (a Blob, "Silica is safe as a food additive," available at https://www.evonik.com/en/company/businesslines/se/about-us/silica-is-safe/silica-is-safe-as-a-food-additive.html). (Year: 2026).*

Inoue, I. et al., Drawing 3D fluid patterns in beverages using a robotic nozzle, Journal of Food Engineering, vol. 357, p. 1-10, 2023 (10 pages); cited in Extended European Search Report dated Aug. 4, 2025.

International Search Report dated Oct. 4, 2022, issued in counterpart International Application No. PCT/JP2022/030519 (2 pages).

* cited by examiner

METHOD AND SYSTEM FOR PRODUCING PATTERNED LIQUID

TECHNICAL FIELD

The present invention relates to a method for producing a pattern-containing liquid and a system for producing a pattern-containing liquid. The present invention specifically relates to a method for producing a pattern-containing liquid and a system for producing a pattern-containing liquid each capable of forming a pattern such as a letter, picture, or uneven distribution of a component in a liquid.

BACKGROUND ART 3D printing is a technique of forming a 3D structure by successively depositing 2D layers of material based on 3D computer-aided design (CAD) data. This technique has been used to form 3D structures from a variety of materials such as metals, polymers, food materials, and cells.

Examples of 3D printing techniques in a liquid phase proposed so far include: a technique of depositing a polymer material while exchanging liquid phases in accordance with the target conditions using a platform that allows for exchange of liquid phases during printing to construct a polymer structure (e.g., see Patent Literature 1); a technique of depositing and solidifying a solidifying material in a gel to form a 3D object suspended within the gel (e.g., see Patent Literature 2); and a technique of introducing, into a first fluid, a second fluid that is immiscible with the first fluid to create a pattern in the first fluid by the use of their immiscibility with each other (e.g., see Patent Literature 3).

CITATION LIST

Patent Literature

Patent Literature 1: US 2020/247053 A1
Patent Literature 2: US 2018/281295 A1
Patent Literature 3: WO 2018/218264

SUMMARY OF INVENTION

Technical Problem

Assuming that a 3D pattern is to be formed in a liquid, the polymer structure formed by the technique of depositing a polymer material as disclosed in Patent Literature 1 needs to be in continuous contact with the bottom or wall of the platform, which restricts the flexibility in design of 3D pattern. In some cases of providing a liquid containing a 3D pattern as a beverage, this 3D pattern needs not to cause any change in mouthfeel of the beverage. Since the technique disclosed in Patent Literature 1 forms a bulky (a mass of) polymer structure in a beverage, i.e., a fluid, this structure inevitably affects the mouthfeel of the beverage. Similarly, in the cases of providing a liquid containing a 3D pattern as a cosmetic, this 3D pattern inevitably affects the feel (texture).

The techniques disclosed in Patent Literature 2 and Patent Literature 3 can create a 3D pattern suspended in a gel or fluid without any contact with the bottom or wall of a container of the gel or fluid. The technique disclosed in Patent Literature 2, however, creates a 3D pattern from a solidifying material, so that a solid structure is formed as in the case of Patent Literature 1. This structure inevitably affects the mouthfeel of a beverage or the texture of a cosmetic. Also, in the case of using a combination of two fluids immiscible with each other, as in Patent Literature 3, the difference in physical properties such as hydrophilicity of the fluids used for drawing affects the mouthfeel of a beverage or the texture of a cosmetic. Such two fluids having different physical properties make it difficult to draw a line because portions of the same fluid fuse with each other while portions of different fluids cause phase separation. This restricts the flexibility in design of 3D pattern to be drawn.

The same issues as described above may arise not only in the case of forming a 3D pattern but also in the case of forming a 1D or 2D pattern in a liquid.

The present invention aims to provide a method for producing a pattern-containing liquid and a system for producing a pattern-containing liquid each having a high flexibility in designing, in liquid, a pattern that can generate any sense such as color vision, taste, flavor, mouthfeel, or texture.

Recent extreme weather, global population growth, and increased consumption are matters of concern for depletion of food resources. In the field of meat, 3D printing of cultured cells is attempted to reproduce the mouthfeel of real meat. In contrast, no such attempt is performed for beverages made from plants. Accordingly, the present invention may also aim to design a micro-scale pattern to provide a plant-based beverage with low environmental load having mouthfeel similar to that of beverages with high environmental load, such as real milk and coffee.

Solution to Problem

To achieve such a pattern-containing liquid, the present inventors focused on the use of edible micro-sized particles for pattern formation in a liquid. In usual cases, these edible micro-sized particles are uniformly dispersed in a liquid while containing an insoluble component so that this component can be easily taken or utilized together with the liquid. The present inventors found out that utilizing a size-dependent diffusion phenomenon of edible micro-sized particles allows the micro-sized particles to remain at their positions in a liquid for a certain period of time, making it possible to arrange the micro-sized particles in a liquid, which serves as the field, and to draw a pattern such as a letter or picture composed of the micro-sized particles and maintain its shape. This is because the micro-sized particles have a lower diffusion coefficient than small molecules such as dye. In addition, similarly to small molecules such as dye, edible micro-sized particles alone are difficult to give mouthfeel in the mouth or texture on the skin. Still, the micro-sized particles can aggregate to each other in a noncovalent manner and can resultantly give mouthfeel or texture. This therefore enables flexible control of the presence and the degree of the mouthfeel or texture of the pattern formed by micro-sized particles.

In other words, the present invention relates to, although not limited to, the following method for producing a pattern-containing liquid and system for producing a pattern-containing liquid.

<1> A method for producing a pattern-containing liquid, including: discharging, using a position-controllable nozzle, a pattern-forming material in which first micro-sized particles containing a first edible organic substance are dispersed in a first liquid into a second liquid in which second micro-sized particles containing a second edible organic substance are dispersed in an amount of 0% by volume or more and 74% by volume or less, thereby forming a pattern from the first micro-sized particles.

<2> The method for producing a pattern-containing liquid according to the above item <1>, wherein the first micro-sized particles constituting the pattern and/or the second micro-sized particles are not chemically bonded to each other by a crosslinker.

<3> The method for producing a pattern-containing liquid according to the above item <1> or <2>, wherein the first micro-sized particles and/or the second micro-sized particles aggregate each other in a noncovalent manner to give mouthfeel.

<4> The method for producing a pattern-containing liquid according to any one of the above items <1> to <3>, wherein a diameter of the first and/or second micro-sized particles is 0.13 μm or greater and 1000 μm or smaller.

<5> The method for producing a pattern-containing liquid according to any one of the above items <1> to <4>, wherein a ratio of a density of the first micro-sized particles and a ratio of a density of the second micro-sized particles to a density of the second liquid are each 0.9 or higher and 1.1 or lower, and a ratio of the density of the second liquid to a density of the first liquid is 0.9 or higher and 1.1 or lower.

<6> The method for producing a pattern-containing liquid according to any one of the above items <1> to <5>, wherein the first liquid and the second liquid have an absolute difference in moisture content of 0% or greater and 50% or smaller.

<7> The method for producing a pattern-containing liquid according to any one of the above items <1> to <6>, wherein the first liquid and the second liquid each have a viscosity of 0.8 mPa·s or higher and 6 Pa·s or lower at 25 °C.

<8> The method for producing a pattern-containing liquid according to any one of the above items <1> to <7>, wherein the nozzle satisfies a relationship $U \times L \leq 10^{-3}$ $m^2/s$, wherein L represents a diameter of the nozzle and U represents a speed of the nozzle in the second liquid.

<9> The method for producing a pattern-containing liquid according to any one of the above items <1> to <8>, wherein a ratio of a value obtained by dividing a discharge flow rate X of the pattern-forming material discharged through the nozzle by an opening area A at a distal end of the nozzle to a speed U of the nozzle in the second liquid is 0.2 or higher and 10 or lower.

<10> A system for producing a pattern-containing liquid in which a pattern is formed in a liquid, the system including:

a tank configured to contain a pattern-forming material in which micro-sized particles containing an edible organic substance are dispersed in a first liquid;

a nozzle configured to discharge the pattern-forming material;

a pump configured to deliver the pattern-forming material to the nozzle; and a controller configured to control a position of the nozzle and a discharge flow rate of the pattern-forming material to be discharged through the nozzle, wherein the controller allows the nozzle to discharge the pattern-forming material while allowing the nozzle to move in a second liquid so as to satisfy a relationship $U \times L \leq 10^{-3}$ $m^2/s$, wherein L represents a diameter of the nozzle and U represents a speed of the nozzle.

[1] A method for producing a pattern-containing liquid, including: discharging, using a position-controllable nozzle, a pattern-forming material in which first micro-sized particles containing a first edible organic substance are dispersed in a first liquid into a second liquid, thereby forming a pattern from the first micro-sized particles.

[2] The method for producing a pattern-containing liquid according to the above item [1], wherein the first micro-sized particles constituting the pattern are not chemically bonded to each other by a crosslinker.

[3] The method for producing a pattern-containing liquid according to the above item [1] or [2], wherein a diameter of the first micro-sized particles is 0.13 μm or greater and 1000 μm or smaller.

[4] The method for producing a pattern-containing liquid according to any one of the above items [1] to [3], wherein a ratio of a density of the first micro-sized particles to a density of the second liquid is 0.9 or higher and 1.1 or lower, and a ratio of the density of the second liquid to a density of the first liquid is 0.9 or higher and 1.1 or lower.

[5] The method for producing a pattern-containing liquid according to any one of the above items [1] to [4], wherein the first micro-sized particles contain at least one component selected from the group consisting of a colorant, a taste component, a nutrient, and a flavor component.

[6] The method for producing a pattern-containing liquid according to any one of the above items [1] to [5], wherein the first micro-sized particles contain at least one of silica or titania.

[7] The method for producing a pattern-containing liquid according to any one of the above items [1] to [6], wherein the first edible organic substance includes at least one edible organic substance selected from the group consisting of a polysaccharide, polypeptide, higher alcohol, natural resin, lipid, higher fatty acid ester, polyphenol, polyvinyl alcohol, polyethylene glycol, and nucleic acid.

[8] The method for producing a pattern-containing liquid according to any one of the above items [1] to [7], wherein the first micro-sized particles aggregate each other in a noncovalent manner to give mouthfeel.

[9] The method for producing a pattern-containing liquid according to any one of the above items [1] to [8], wherein the first liquid and the second liquid have an absolute difference in moisture content of 0% or greater and 50% or smaller.

[10] The method for producing a pattern-containing liquid according to any one of the above items [1] to [9], wherein the first liquid and the second liquid each have a viscosity of 0.8 mPa·s or higher and 6 Pa·s or lower at 25 °C.

[11] The method for producing a pattern-containing liquid according to any one of the above items [1] to [10], wherein the first liquid is an aqueous solution.

[12] The method for producing a pattern-containing liquid according to any one of the above items [1] to [11], wherein the nozzle is flexibly movable along multiple axes.

[13] The method for producing a pattern-containing liquid according to any one of the above items [1] to [12], wherein the second liquid is contained in a container and the nozzle has a length that is at least greater than a depth of the second liquid contained in the container.

[14] The method for producing a pattern-containing liquid according to any one of the above items [1] to [13], wherein the nozzle satisfies a relationship $U \times L \leq 10^{-3}$ $m^2/s$, wherein L represents a diameter of the nozzle and U represents a speed of the nozzle in the second liquid.

[15] The method for producing a pattern-containing liquid according to any one of the above items [1] to [14], wherein a ratio of a value obtained by dividing a discharge flow rate X of the pattern-forming material discharged through the nozzle by an opening area A at a distal end of the nozzle to a speed U of the nozzle in the second liquid is 0.2 or higher and 10 or lower.

[16] The method for producing a pattern-containing liquid according to any one of the above items [1] to [15], wherein the nozzle has a circular, elliptic, triangular, rectangular, square, rhombic, V-shaped, U-shaped, or C-shaped distal end.

[17] The method for producing a pattern-containing liquid according to any one of the above items [1] to [16], wherein second micro-sized particles containing a second edible organic substance are dispersed in the second liquid and the pattern-forming material is to be discharged into the second liquid in which the second micro-sized particles are dispersed.

[18] The method for producing a pattern-containing liquid according to the above item [17], wherein the second micro-sized particles are not chemically bonded to each other by a crosslinker.

[19] The method for producing a pattern-containing liquid according to the above item [17] or [18], wherein a diameter of the second micro-sized particles is 0.13 μm or greater and 1000 μm or smaller.

[20] The method for producing a pattern-containing liquid according to any one of the above items [17] to [19], wherein a ratio of a density of the second micro-sized particles relative to each of the density of the first micro-sized particles, the density of the first liquid, and the density of the second liquid is 0.9 or higher and 1.1 or lower.

[21] The method for producing a pattern-containing liquid according to any one of the above items to [20], wherein the second micro-sized particles contain at least one component selected from the group consisting of a colorant, a taste component, a nutrient, and a flavor component.

[22] The method for producing a pattern-containing liquid according to any one of [17] to [21], wherein the second micro-sized particles contain at least one of silica or titania.

[23] The method for producing a pattern-containing liquid according to any one of the above items [17] to [22], wherein the second edible organic substance includes at least one edible organic substance selected from the group consisting of a polysaccharide, polypeptide, higher alcohol, natural resin, lipid, higher fatty acid ester, polyphenol, polyvinyl alcohol, polyethylene glycol, and nucleic acid.

[24] The method for producing a pattern-containing liquid according to any one of the above items [17] to [23], wherein the second micro-sized particles aggregate each other in a noncovalent manner to give mouthfeel.

[25] A system for producing a pattern-containing liquid in which a pattern is formed in a liquid, the system including:

a tank configured to contain a pattern-forming material in which micro-sized particles containing an edible organic substance are dispersed in a first liquid;

a nozzle configured to discharge the pattern-forming material;

a pump configured to deliver the pattern-forming material to the nozzle; and a controller configured to control a position of the nozzle and a discharge flow rate of the pattern-forming material to be discharged through the nozzle, wherein the controller allows the nozzle to discharge the pattern-forming material while allowing the nozzle to move in a second liquid so as to satisfy a relationship $U \times L \leq 10^{-3}$ $m^2/s$, wherein L represents a diameter of the nozzle and U represents a speed of the nozzle.

[26] The method for producing a pattern-containing liquid according to the above item [25], wherein a ratio of a value obtained by dividing a discharge flow rate X of the pattern-forming material discharged through the nozzle by an opening area A at a distal end of the nozzle to a speed U of the nozzle in the second liquid is 0.2 or higher and 10 or lower.

[27] A method for producing a pattern-containing liquid, including discharging, using a position-controllable nozzle, a first liquid into a second liquid in which micro-sized particles containing an edible organic substance are dispersed, thereby forming a pattern from the first liquid.

[28] A system for producing a pattern-containing liquid in which a pattern is formed in a liquid, the system including:

a tank configured to contain a first liquid;

a nozzle configured to discharge the first liquid;

a pump configured to deliver the first liquid to the nozzle; and a controller configured to control a position of the nozzle and a discharge flow rate of the first liquid to be discharged through the nozzle, wherein the controller allows the nozzle to discharge the pattern-forming material while allowing the nozzle to move in a second liquid in which micro-sized particles containing an edible organic substance are dispersed, so as to satisfy a relationship $U \times L \leq 10^{-3}$ $m^2/s$, wherein L represents a diameter of the nozzle and U represents a speed of the nozzle.

[29] The method for producing a pattern-containing liquid according to the above item [23], wherein a ratio of a value obtained by dividing a discharge flow rate X of the first liquid discharged through the nozzle by an opening area A at a distal end of the nozzle to a speed U of the nozzle in the second liquid is 0.2 or higher and 10 or lower.

Advantageous Effects of Invention

The present invention can provide a method for producing a pattern-containing liquid and a system for producing a pattern-containing liquid each having a high flexibility in designing, in liquid, a pattern that can generate any sense such as color vision, taste, mouthfeel, or texture.

DESCRIPTION OF EMBODIMENTS

Figure 1:
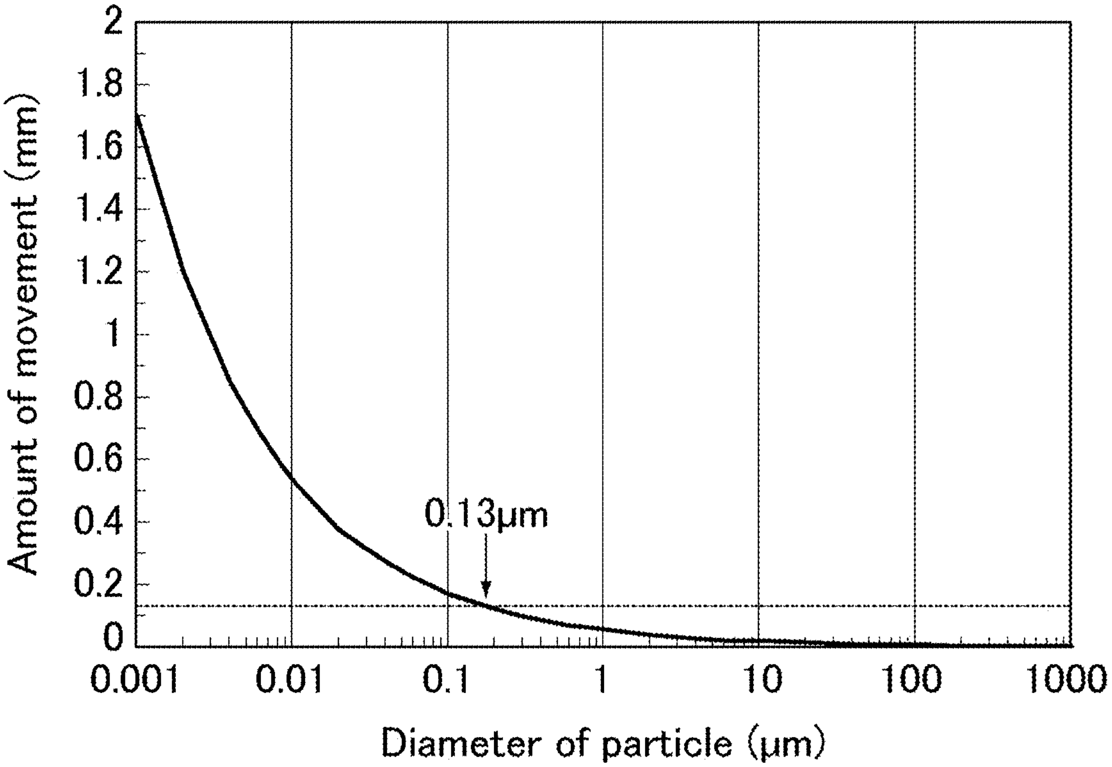
FIG. 1 is a graph of theoretical values of the relationship between a typical amount of movement in one hour of a micro-sized particle placed in a liquid and the diameter of the micro-sized particle.

A method for producing a pattern-containing liquid according to a first aspect of the present invention (hereinafter, also simply referred to as a production method according to the first aspect) includes discharging, using a position-controllable nozzle, a pattern-forming material in which first micro-sized particles containing a first edible organic substance are dispersed in a first liquid into a second liquid, thereby forming a pattern from the first micro-sized particles.

The production method according to the first aspect includes discharging, using a position-controllable nozzle, a pattern-forming material in which first micro-sized particles containing a first edible organic substance are dispersed in a first liquid into a second liquid, thereby forming a pattern from the first micro-sized particles. This can draw a pattern such as a letter or picture composed of the first micro-sized particles in the second liquid, which serves as the field, and maintain its shape. Accordingly, the production method can provide a pattern-containing liquid with a flexibly designed pattern such as color vision, taste, flavor, mouthfeel, or texture. For example, introducing components such as a colorant, taste substance, and a flavor component into the first micro-sized particles enables designing of spatial color vision, taste, and flavor in the second liquid. Also, controlling the aggregation of the first micro-sized particles enables designing of spatial mouthfeel or texture in the second liquid. Further, micro-designing of a pattern composed of the first micro-sized particles enables production of plant-based beverages with low environmental load having mouthfeel similar to that of beverages with high environmental load, such as real milk and coffee.

The "liquid" as used herein may be any liquid substance that can be taken by drinking or can be applied to the skin. Accordingly, the first liquid and the second liquid are each basically preferably an aqueous solution.

The first liquid and the second liquid may be of any types and may include beverages in general. Specific examples thereof include water; tea; coffee; soft drinks such as fruit juice drinks, soda drinks, functional drinks, sports drinks, energy drinks, and alcohol-free drinks; alcoholic drinks; quasi-drug energy drinks; milk; soy milk; soups; smoothie; frozen drinks; frozen cocktails; and milk shakes. To make the pattern composed of the first micro-sized particles visually observable from the outside of the second liquid, the second liquid preferably has transparency that allows the pattern to be visually observable through the second liquid. From the same viewpoint, the second liquid may be either a colored or colorless, transparent liquid. The first liquid and the second liquid may be liquids of different types or may be liquids of the same type. The first liquid and the second liquid each may be a single type of liquid or may include multiple types of liquids which are mixed with or separated from each other.

The types of first liquid and the second liquid may be skin cosmetics such as perfume, skin toner, or lotion.

The types of the first liquid and the second liquid may be liquids suitable for cell growth and maintenance, such as culture media or buffers.

The pattern may be any of a 1D pattern (line), a 2D pattern (plane), and a 3D pattern (solid). Examples of the pattern include, but are not limited to, those generating color vision such as signs, including letters, and pictures, those generating taste, mouthfeel, or texture such as uneven distribution of components, and those generating these senses in combination.

The first micro-sized particles are micro-sized particles containing a first edible organic substance. The first micro-sized particles are micro-sized particles, preferably having a diameter of 0.13 μm or greater as described later. Thus, the first micro-sized particles discharged into the second liquid exhibit a limited diffusion due to their sizes and can remain around the position where they are discharged for several tens of minutes to several tens of hours in a size-dependent manner. Thereby, a pattern-containing liquid can be produced in which a pattern composed of the first micro-sized particles is placed at any position in the second liquid. The particle structure of the first micro-sized particles may be, but is not limited to, a uniform structure, a core-shell structure, or a Janus structure.

The first micro-sized particles are preferably insoluble or slightly soluble in the first liquid and the second liquid (it may be water). This makes it possible to store the first micro-sized particles in the form of dispersion in the first liquid for a long term and to maintain the first micro-sized particles in the second liquid for a long time.

The first micro-sized particles constituting the pattern are preferably not chemically bonded to each other by a cross-linker. This makes it possible to avoid aggregation of the pattern composed of the first micro-sized particles and thereby to easily drink the pattern together with the second liquid.

A preferred range of the size of the first micro-sized particles is described here. Particles added dropwise to a liquid diffuse by the Brownian motion. A typical moving distance x during a certain period of time t in this diffusion can be calculated by the following Formula 1 using the diffusion coefficient D of the particles.

$$x=\sqrt{(2Dt)} \quad \text{(Formula 1)}$$

The diffusion coefficient D can be calculated by the Stokes-Einstein relation (the following Formula 2):

$$D=(k_BT)/(3\pi\eta d) \quad \text{(Formula 2)}$$

wherein d represents the particle diameter, $k_B$ represents the Boltzmann's constant, T represents the absolute temperature, and $\eta$ represents the viscosity of liquid forming the system.

When 1-μm-diameter particles are added dropwise to a liquid having a viscosity equivalent to that of water at 20 °C, the diffusion coefficient D is $4\times10^{-13}$ $m^2/s$ and the individual particles typically move 50 μm in one hour and 260 μm in 24 hours.

Theoretical values of the relationship between a typical amount of movement in one hour of a micro-sized particle placed in a liquid and the diameter of the micro-sized particle is shown in FIG. 1. FIG. 1 is a graph of the theoretical values of the relationship between a typical amount of movement in one hour of a micro-sized particle placed in a liquid in one hour and the diameter of the micro-sized particle. As shown in FIG. 1, the greater the particle size is, the more restricted the diffusion by the Brownian motion is. Assuming that a pattern-forming material containing micro-sized particles is used to draw a pattern with a line width of 1 mm in a liquid and that the micro-sized particles constituting the line diffuse three-dimensionally, the diameter of the micro-sized particles that thickens the line by 30% (0.3 mm) or more in one hour is 0.13 μm or smaller. For example, in the case where a pattern-forming material containing 0.13-μm-diameter micro-sized particles is used to draw two lines each having a line width of 1 mm at an interval of 1 mm and where each line thickens 1.3 times, the distance between the two adjacent lines is still 0.3 mm and the two lines can therefore be distinguished from each other. In other words, using micro-sized particles having a diameter of 0.13 μm or greater enables drawing of a pattern that is recognizable even after one hour from the drawing.

Consequently, the diameter of the first micro-sized particles may be 0.13 μm or greater and is preferably 0.2 μm or greater and 1000 μm or smaller. With a diameter of 0.2 μm or greater, a pattern drawn with a line width of 1 mm in the second liquid can be sufficiently maintained even after the pattern is left for one hour. With a diameter of 1000 μm or smaller, grainy texture can be reduced when the first micro-sized particles are put into a mouth (for example, see the following Reference 1). From this viewpoint, the diameter is more preferably 100 μm or smaller. The diameter of the first micro-sized particles is more preferably 0.3 μm or greater, still more preferably 0.5 μm or greater, while still more preferably 50 μm or smaller.

The "diameter of micro-sized particles" as used herein means the mode diameter in the particle size distribution of the micro-sized particles measured by dynamic light scattering (DLS).

Preferably, the ratio of the density of the first micro-sized particles to the density of the second liquid (density of first micro-sized particles/density of second liquid) is 0.9 or higher and 1.1 or lower, and the ratio of the density of the second liquid to the density of the first liquid (density of second liquid/density of first liquid) is 0.9 or higher and 1.1 or lower. In the case where these ratios are each 0.9 or higher and 1.1 or lower, the pattern composed of the first micro-sized particles may less float or precipitate together with the first liquid in the second liquid. From this viewpoint, each of these ratios is more preferably 0.92 or higher and 1.08 or lower, still more preferably 0.95 or higher and 1.05 or lower.

The "density" as used herein means the weight per unit volume. The "density of micro-sized particles" as used herein means the density corresponding to the smallest density among the densities obtained as follows. Micro-sized particles are (or a pattern-forming material is) added dropwise to solutions (e.g., glycerol aqueous solutions) of various concentrations and centrifuged under predetermined conditions (e.g., at 18500×g for one minute). The smallest density is then selected from the densities of the solutions in which no precipitation of the micro-sized particles is observed. This solution and the "density of liquid" can be measured using a density meter (DMA 4500 M, available from Anton Paar GmbH).

The first micro-sized particles preferably contain at least one component selected from the group consisting of a colorant, a taste component, a nutrient, and a flavor component. The presence of these additives in the first micro-sized particles allows a pattern composed of the first micro-sized particles to have a design with a variety of spatial senses. For example, in the presence of a colorant, a pattern composed of the first micro-sized particles can exhibit a spatial color design; in the presence of a taste component, a pattern composed of the first micro-sized particles can provide a spatial taste design; in the presence of a nutrient, a pattern composed of the first micro-sized particles can provide a spatial nutrient design; and in the presence of a flavor component, a pattern composed of the first micro-sized particles can provide a spatial fragrant design. Examples of the colorant include a red colorant, green colorant, blue colorant, black colorant, and white colorant. Examples of the taste component include sucrose, fructose, table salt, glucose, amino acids, nucleic acids, acetic acid, malic acid, citric acid, caffeine, tannin, capsaicin, glycerol, and food extracts. Examples of the nutrient include vitamins, minerals, lipids, fatty acids, polypeptides, sugars, healthy material molecules, and food extracts. Examples of the flavor component include food flavoring compounds designated in Appended Table 1 of Ordinance for Enforcement of the Food Sanitation Act, such as vanillin, eugenol, geraniol, and citral, and food extracts. The first micro-sized particles may include multiple types of particles which are different in terms of the presence or absence of colorant or in terms of the types of colorant contained (e.g., different colors). The same applies to the taste component, the nutrient, and the flavor component. The first micro-sized particles may include multiple types of particles which are different in terms of the presence or absence of these additives or in terms of the types of additives contained.

The first micro-sized particles preferably contain at least one of silica (silicon dioxide) or titania (titanium dioxide). The first micro-sized particles containing these additives can better express a white color and can better develop other colors.

The first micro-sized particles may contain a hydrophobic substance or hydrophilic substance for maintaining the aforementioned additives such as colorant and silica in the micro-sized particles. The first micro-sized particles may have a structure in which a layer containing a hydrophobic substance and a layer containing a hydrophilic substance are alternately arranged from the center to the outside, such as a trilayer structure of a hydrophilic substance, a hydrophobic substance, and a hydrophilic substance or of a hydrophobic substance, a hydrophilic substance, and a hydrophobic substance.

The first micro-sized particles contain a first edible organic substance. The first edible organic substance is a substance that is to function as a main component for forming the particle shapes of the first micro-sized particles. The “edible organic substance” as used herein means an organic substance to be eaten by a human, regardless of whether a human can digest it and whether a human can absorb it. The first edible organic substance may have any molecular weight, and the first edible organic substance is preferably a high molecular weight substance.

The first edible organic substance preferably includes at least one edible organic substance selected from the group consisting of a polysaccharide, polypeptide, higher alcohol, natural resin, lipid, higher fatty acid ester, polyphenol, polyvinyl alcohol, polyethylene glycol, and nucleic acid (DNA). The “polysaccharide” as used herein means a sugar in which multiple (two or more molecules of) monosaccharides are bonded to each other. The “polypeptide” as used herein means a compound in which many amino acids are strung by peptide bonds, and encompasses proteins.

Preferred specific examples of the polysaccharide include dextrin, pectin, agar, agarose, glucomannan, polydextrose, maltodextrin, alginic acid (e.g., sodium alginate, calcium alginate), cellulose, hemicellulose, chitin, chitosan, starch (e.g., amylum), dextran, agarose, sucrose, methyl cellulose, carboxymethyl cellulose, and hydroxypropyl cellulose. One of these may be used alone or two or more of these may be used in combination.

Preferred specific examples of the polypeptide include gelatin, hydrolyzed protein, collagen, and albumin. One of these may be used alone or two or more of these may be used in combination.

Preferred specific examples of the higher alcohol include dodecyl alcohol and cetyl alcohol. One of these may be used alone or two or more of these may be used in combination.

Preferred specific examples of the natural resin include gum arabic, shellac, wax, lignin, and polylactic acid. One of these may be used alone or two or more of these may be used in combination.

A preferred specific example of the lipid is lecithin.

For the above preferred specific examples of the components in different categories, such as a polysaccharide and a polypeptide, two or more of these may be used in combination.

Specific examples of the first edible organic substance include those mentioned as specific examples of the additives such as the aforementioned taste components and nutrients. These examples mentioned above are first edible organic substances that are to function also as a component such as a taste component or a nutrient. The “edible organic substance” as used herein includes not only what are called foods and food additives but also drugs and quasi drugs, and means an orally ingestible organic substance.

The first micro-sized particles may be cells such as human-derived cells, animal cells, plant cells, and microbial cells. Using these cells as the first micro-sized particles allows a pattern composed of the first micro-sized particles to have a variety of physiological functions. Note that these cells contain a first edible organic substance.

The first micro-sized particles may aggregate each other in a noncovalent manner to generate mouthfeel or texture. This allows a pattern composed of the first micro-sized particles to have a spatial design of mouthfeel or texture. The micro-sized particles may be aggregated in a noncovalent manner by any method. For example, the surfaces of the micro-sized particles may be charged with electricity for aggregation.

In the production method according to the first aspect, the first micro-sized particles are dispersed in the first liquid before discharged into the second liquid, and are to be discharged as a pattern-forming material into the second liquid using a position-controllable nozzle. As described, the first liquid forms a liquid substance containing the first micro-sized particles so as to allow the first micro-sized particles to be discharged into the second liquid using a nozzle. In the case where the first micro-sized particles contain a coloring component (exhibit a color), the first liquid with the first micro-sized particles dispersed therein, i.e., the pattern-forming material, is to function as a pattern-forming ink.

The volume percent concentration of the first micro-sized particles in the pattern-forming material may be, but is not limited to, preferably 0.05% by volume or more and 50% by volume or less, more preferably 0.1% by volume or more and 40% by volume or less, still more preferably 0.5% by volume or more and 30% by volume or less.

The “volume percent concentration of the first micro-sized particles in the pattern-forming material” as used herein can be determined by the coulter counter method.

The pattern-forming material to be discharged into the second liquid may be of any type. One pattern-forming material alone may be discharged into the second liquid, or two or more pattern-forming materials which are different in at least one of the type of the first micro-sized particles or the type of the first liquid may be discharged into the second liquid simultaneously or successively.

To maintain a pattern composed of the first micro-sized particles in the second liquid for a long term, the first liquid is preferably one compatible with the second liquid, and may be the same liquid as the second liquid or a liquid similar to the second liquid. This is described in detail below.

The first liquid and the second liquid preferably have an absolute difference in moisture content of 0% or greater and 50% or smaller. Combination of liquids with no difference in moisture content can change the taste or color vision without changing the mouthfeel or texture. Combination of liquids with a difference in moisture content can change the mouthfeel or texture. This absolute difference therebetween is more preferably 25% or smaller, still more preferably 15% or smaller. In common cases, the moisture content of the first liquid is smaller than the moisture content of the second liquid.

The "moisture content of a liquid" as used herein can be determined by the loss on drying test. Specifically, a sample containing moisture (liquid herein) is weighed and placed in a temperature-constant chamber at a predetermined temperature so that the moisture is evaporated. The weight change of the sample is then calculated, whereby the moisture content can be determined.

The first liquid and the second liquid each preferably have a viscosity of 0.8 mPa·s or higher and 6 Pa·s or lower at 25 °C. In the case where they each have a viscosity of 0.8 mPa·s or higher and 6 Pa·s or lower at 25 °C, diffusion of the first liquid in the second liquid can be easily reduced. This allows a pattern composed of the first micro-sized particles to maintain its shape in the second liquid for a longer term. From this viewpoint, the viscosity of each of them is more preferably 3 Pa·s or lower, still more preferably 1 Pa·s or lower at 25 °C. In an embodiment, the viscosity of the first liquid and the viscosity of the second liquid are each preferably 1 mPa·s or higher and 100 mPa·s or lower, more preferably 1 mPa·s or higher and 50 mPa·s or lower at 25 °C. The viscosity of the first liquid may be higher than the viscosity of the second liquid or vice versa, or they may be substantially equal to each other.

The "viscosity of a liquid" as used herein can be determined using the density measured using a density meter (e.g., DMA 4500 M available from Anton Paar GmbH) and a value from a tuning fork vibro viscometer (e.g., SV-10 available from A & D Co., Ltd.).

Examples of the viscosities at 25 °C of foods available as the first liquid and the second liquid are shown below:

water 1 mPa·s; milk 2 to 10 mPa·s; soy source 5 to 10 mPa·s; fruit juice drinks 10 mPa·s; tomato juice 19 mPa·s; undiluted solution of lactic acid bacteria drink 40 to 50 mPa·s; salad oil 50 to 80 mPa·s; maple syrup 200 mPa·s; yogurt 500 mPa·s; Chuno source 170 to 800 mPa·s; egg yolk 500 to 900 mPa·s; tomato ketchup 2 Pa·s; mayonnaise 8 Pa·s; honey 10 to 50 Pa·s; and starch syrup 100 Pa·s.

The nozzle is a hollow pipe having an opening at each end. The pattern-forming material in which the first micro-sized particles are dispersed in the first liquid is introduced through the proximal end of the nozzle, passed through the hollow inside the nozzle, and then discharged through the distal end of the nozzle. The three-dimensional position of the nozzle and the discharge flow rate of the pattern-forming material discharged through the distal end of the nozzle are commonly controlled by a controller of a system for producing a pattern-containing liquid to be described later. Any number of nozzles, such as one nozzle or multiple nozzles, may be used.

The nozzle is preferably flexibly movable along multiple axes (e.g., three or more axes and eight or less axes). This nozzle can easily form a 3D pattern as a pattern composed of the first micro-sized particles. Not only the nozzle but also a container of the second liquid may be moved.

Preferably, the second liquid is contained in a container (e.g., glass or cup) and the nozzle has a length that is at least greater than the depth of the second liquid contained in the container. This enables formation of a pattern composed of the first micro-sized particles at any position in the second liquid using the nozzle.

In forming a pattern in a liquid, the nozzle may generate a turbulent flow to disturb the pattern. In general, such a turbulent flow can be more reduced as the Reynolds number (Re) is smaller. Advantageously, the Reynolds number is 1000 or smaller. The Reynolds number is defined by the following Formula 3:

$$Re=(UL)/v \qquad \text{(Formula 3)}$$

wherein U represents the speed, L represents the length, and v represents the kinematic viscosity.

Figure 2:
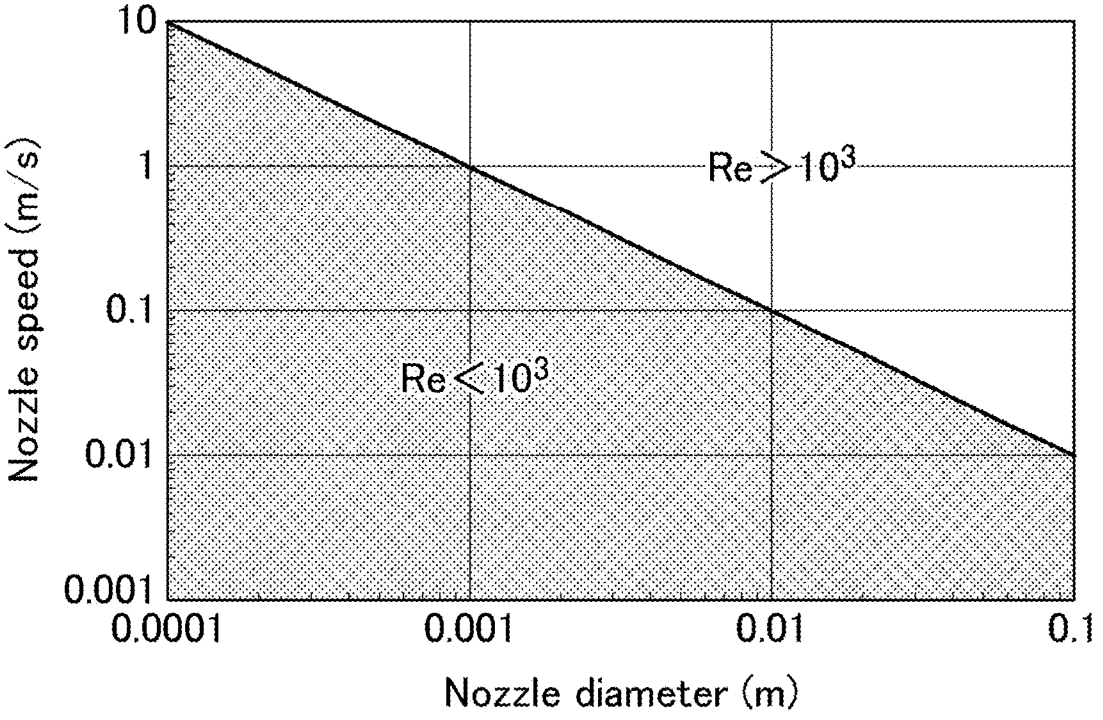
FIG. 2 is a graph of theoretical values of the range where the Reynolds number is 1000 or smaller when a nozzle is moved in a liquid.

Based on the kinematic viscosity v of water at 20 °C$=1\times10^{-6}$ m$^2$/s, with the nozzle diameter being represented by L and the nozzle speed in the second liquid by U, the relationship between the nozzle diameter L and the nozzle speed U that gives a Reynolds number of 1000 or smaller is shown as a gray region in FIG. 2. FIG. 2 shows theoretical values of the range where the Reynolds number is 1000 or smaller when the nozzle is moved in the liquid. In other words, the nozzle diameter L (m) and the nozzle speed U (m/s) in the second liquid preferably satisfy the relationship $U\times L\leq10^{-3}$ m$^2$/s. This enables effective reduction in generation of a turbulent flow by the nozzle and formation of a clear pattern having a desired shape. From this viewpoint, the nozzle diameter L (m) and the nozzle speed U (m/s) in the second liquid more preferably satisfy the relationship $U\times L\leq5\times10^{-4}$ m$^2$/s, still more preferably the relationship $U\times L\leq10^{-4}$ m$^2$/s.

The "nozzle diameter L" as used herein means the length measured at the longest portion of the opening at the distal end of the nozzle. For example, in the case of a nozzle having a circular opening at the distal end, the term indicates the diameter. In the case of an elliptic opening, the term means the length of the major axis. In the case of a quadrangular opening, the term means the length of the longer diagonal. In the case of a nozzle having a recessed opening, such as a V-shaped, U-shaped, or C-shaped opening, at the distal end, the term means the diameter of the smallest circle that encloses the shape.

In the case where the speed U (m/s) of the nozzle, the discharge flow rate X (m$^3$/s) of the pattern-forming material to be discharged through the nozzle, and the opening area A (m$^2$) at the distal end of the nozzle satisfy the following Formula 1, drawing seems to be stable because this relationship can reduce the relative speed of the pattern-forming material discharged relative to the nozzle and can reduce generation of a turbulent flow by the nozzle. In particular, when the direction of moving the nozzle is the same as the direction of discharging the pattern-forming material and the relationship of the following Formula 1 is satisfied, drawing can be significantly stable.

$$U=X/A \qquad \text{(Formula 1)}$$

Satisfying the relationship (X/A)/U=1 is ideal as described above, but the ratio (X/A)/U deviated from 1 by a certain degree also enables effective reduction in generation of a turbulent flow by the nozzle and formation of a clear pattern having a desired shape.

Specifically, to effectively reduce generation of a turbulent flow by the nozzle and to form a clear pattern having a desired shape, the ratio (X/A)/U of a value obtained by dividing the discharge flow rate X (m$^3$/s) of the pattern-forming material discharged through the nozzle by the opening area A ($m^2$) at the distal end of the nozzle to the speed U (m/s) of the nozzle in the second liquid (hereinafter, also referred to as the ratio of speed) is preferably 0.2 or higher and 10 or lower, more preferably 0.3 or higher and 8 or lower, still more preferably 0.4 or higher and 5 or lower. If this ratio of speed is lower than 0.2 or higher than 10, the Reynolds number is greater, which may be a cause of generation of a turbulent flow.

The distal end of the nozzle may have any opening shape. The nozzle preferably has a circular, elliptic, triangular, rectangular, square, rhombic, V-shaped, U-shaped, or C-shaped distal end.

The micro-sized particles may also be dispersed in the second liquid into which the pattern-forming material is to be discharged. In other words, second micro-sized particles containing a second edible organic substance may be dispersed in the second liquid and the pattern-forming material may be discharged into the second liquid in which the second micro-sized particles are dispersed. In contrast, the micro-sized particles may not be dispersed in the second liquid into which the pattern-forming material is to be discharged. Accordingly, the pattern-forming material is discharged into the second liquid in which the second micro-sized particles containing the second edible organic substance are dispersed in an amount of 0% by volume or more and 74% by volume or less.

The second micro-sized particles in the second liquid may have any volume percent concentration that is 0% by volume or more and 74% by volume or less. The volume percent concentration is preferably 0.1% by volume or more and 70% by volume or less, more preferably 1% by volume or more and 60% by volume or less, still more preferably 5% by volume or more and 50% by volume or less. Since the concentration of micro-sized particles in a liquid has no influence on the formation of a pattern in the liquid, this concentration can be set to any value. When the same particles are placed in a liquid in the densest arrangement, this arrangement constitutes the hexagonal close-packed structure and the atomic packing factor of this structure is calculated to be about 74% by volume. Thus, the highest volume percent concentration of the second micro-sized particles in the second liquid is 74% by volume.

The "volume percent concentration of the second micro-sized particles in the second liquid" as used herein can be determined by the coulter counter method.

The second micro-sized particles are preferably not chemically bonded to each other by a crosslinker. This makes it possible to avoid aggregation of the second micro-sized particles and thereby to easily drink the second micro-sized particles together with the second liquid.

From the same viewpoint as in the first micro-sized particles, the diameter of the second micro-sized particles may be 0.13 μm or greater, preferably 0.2 μm or greater and 1000 μm or smaller, more preferably 100 μm or smaller. The diameter of the second micro-sized particles is more preferably 0.3 μm or greater, still more preferably 0.5 μm or greater, still more preferably 50 μm or smaller.

Similarly to the cases of the first micro-sized particles and the second liquid, the ratios of the density of the second micro-sized particles to the density of the first micro-sized particles, to the density of the first liquid, and to the density of the second liquid (density of second micro-sized particles/density of first micro-sized particles, density of second micro-sized particles/density of first liquid, and density of second micro-sized particles/density of second liquid) are each preferably 0.9 or higher and 1.1 or lower. Each of these ratios is more preferably 0.92 or higher and 1.08 or lower, still more preferably 0.95 or higher and 1.05 or lower.

The second micro-sized particles may contain at least one component selected from the group consisting of a colorant, a taste component, a nutrient, and a flavor component. Specific examples of these components include those mentioned for the first micro-sized particles. The second micro-sized particles may include multiple types of particles which are different in terms of the presence or absence of colorant or in terms of the types of colorant contained (e.g., different colors). The same applies to the taste component, the nutrient, and the flavor component. The second micro-sized particles may include multiple types of particles which are different in terms of the presence or absence of these additives or in terms of the types of additives contained.

From the same viewpoint as in the first micro-sized particles, the second micro-sized particles preferably contain at least one of silica or titania.

The second micro-sized particles may contain a hydrophobic substance or hydrophilic substance for maintaining the aforementioned additives such as colorant and silica in the micro-sized particles.

The second micro-sized particles contain a second edible organic substance. The second edible organic substance is a substance that is to function as a main component for forming the particle shapes of the second micro-sized particles. The second edible organic substance may have any molecular weight, and the second edible organic substance is preferably a high molecular weight substance.

The second edible organic substance preferably includes at least one edible organic substance selected from the group consisting of a polysaccharide, polypeptide, higher alcohol, natural resin, lipid, higher fatty acid ester, polyphenol, polyvinyl alcohol, polyethylene glycol, and nucleic acid (DNA). Preferred specific examples of these edible organic substances include those mentioned for the first edible organic substance. Similarly to the case of the first edible organic substance, one preferred specific example of the edible organic substance may be used alone or two or more of these may be used in combination. For the above preferred specific examples of the components in different categories, such as a polysaccharide and a polypeptide, two or more of these may be used in combination. Similarly to the case of the first micro-sized particles, specific examples of the edible organic substance may include those mentioned as specific examples of the additives such as a taste component and a nutrient. These examples mentioned above are edible organic substances that are to function also as a component such as a taste component or a nutrient.

The second micro-sized particles may aggregate each other in a noncovalent manner to generate mouthfeel or texture. This can generate mouthfeel or texture in the second liquid in which the second micro-sized particles are dispersed and thereby generate a difference in mouthfeel or texture between a pattern composed of the first micro-sized particles and the second liquid in which the second micro-sized particles are dispersed.

Next, a system for producing a pattern-containing liquid according to a second aspect of the present invention (hereinafter, also simply referred to as a production system according to the second aspect) is described below. The features common to the production method according to the first aspect are applicable to the production system according to the second aspect and are therefore not elaborated hereinbelow.

The production system according to the second aspect is a system for producing a pattern-containing liquid in which a pattern is formed in a liquid, the system including: a tank configured to contain a pattern-forming material in which micro-sized particles containing an edible organic substance are dispersed in a first liquid; a nozzle configured to discharge the pattern-forming material; a pump configured to deliver the pattern-forming material to the nozzle; and a controller configured to control the position of the nozzle and the discharge flow rate of the pattern-forming material to be discharged through the nozzle. This allows the pump to feed the pattern-forming material from the tank to the nozzle and allows the nozzle to discharge the pattern-forming material to any position in the second liquid while the controller is allowed to control the position of the nozzle and the discharge flow rate of the pattern-forming material. The discharge flow rate of the pattern-forming material to be discharged can be controlled by changing the pump pressure or the pressure inside the nozzle in response to voltage application to, for example, a piezoelectric element disposed at a nozzle portion. Accordingly, a pattern-containing liquid can be automatically produced by designing a pattern using software such as CAD and controlling the nozzle based on this design. In other words, the production system can produce a pattern-containing liquid having a higher flexibility in designing, in liquid, a pattern that can generate any sense such as color vision, taste, flavor, mouthfeel, or texture. Also, micro-designing of a pattern composed of micro-sized particles enables production of a plant-based beverage with low environmental load having mouthfeel similar to that of beverages with high environmental load, such as real milk and coffee.

The controller allows the nozzle to discharge the pattern-forming material while allowing the nozzle to move in the second liquid so as to satisfy the relationship $U \times L \leq 10^{-3}$ $m^2/s$, wherein L represents the diameter (m) of the nozzle and U represents the speed (m/s) of the nozzle. As described for the production method according to the first aspect, this enables effective reduction in generation of a turbulent flow by the nozzle and formation of a clear pattern having a desired shape. From this viewpoint, the nozzle diameter L (m) and the nozzle speed U (m/s) in the second liquid more preferably satisfy the relationship $U \times L \leq 5 \times 10^{-4}$ $m^2/s$, still more preferably the relationship $U \times L \leq 10^{-4}$ $m^2/s$.

From the same viewpoint as in the production method according to the first aspect, the ratio (X/A)/U of a value obtained by dividing the discharge flow rate X ($m^3/s$) of the pattern-forming material discharged through the nozzle by the opening area A ($m^2$) at the distal end of the nozzle to the speed U (m/s) of the nozzle in the second liquid is preferably 0.2 or higher and 10 or lower, more preferably 0.3 or higher and 8 or lower, still more preferably 0.4 or higher and 5 or lower.

The pattern-forming material contained in the tank may be delivered to the nozzle through a liquid delivery tube. The tank may be any container that can contain the pattern-forming material. The tank may be separate from the pump and the nozzle or may be integrated with the pump and the nozzle. Multiple tanks may be provided in accordance with the type of the pattern-forming material.

The nozzle is as described for the production method according to the first aspect. The nozzle may be coupled with a piezoelectric element, for example. The pressure inside the nozzle may be changed by applying voltage to this piezoelectric element, thereby controlling the discharge flow rate of the pattern-forming material discharged from the nozzle.

The pump may be any pump that can deliver the pattern-forming material to the nozzle, such as a syringe pump or a peristaltic pump.

The controller may be provided with a multi-axial mechanism (e.g., a mechanism having three or more and eight or less axes) coupled with the nozzle and configured to move the position of the nozzle. This controller can control the nozzle along multiple axes and move the nozzle three-dimensionally, i.e., to form a 3D pattern easily. Examples of the multi-axial mechanism to be used include a gantry system (e.g., three axes) and a robot arm (e.g., eight axes).

To control the discharge flow rate of the pattern-forming material, the controller may control the pump pressure or may control the voltage applied to a piezoelectric element provided at the nozzle portion.

The controller may be further provided with a control processor that executes control-processing of components such as the nozzle, the pump, and the multi-axial mechanism. The control processor may include, for example, a software program for executing a variety of processing operations such as control-processing, a central processing unit (CPU) for executing the software program, and a variety of hardware devices (e.g., memory) controlled by the CPU. The software program (e.g., control program using 3D-CAD data) and data for operating the control processor are stored in the memory. The control processor may be provided together with the multi-axial mechanism at a place where a pattern-containing liquid is to be produced (e.g., in the same store), or an element related to at least one function of the control processor may be separately provided at a place different from the production site for a pattern-containing liquid (e.g., cloud).

The production system according to the second aspect may further include a stage that can bear a container containing the second liquid, and the stage may be movably arranged. The controller may allow the nozzle to discharge the pattern-forming material into the second liquid while allowing not only the nozzle but also the stage, i.e., the second liquid contained in a container, to move.

Figure 3:
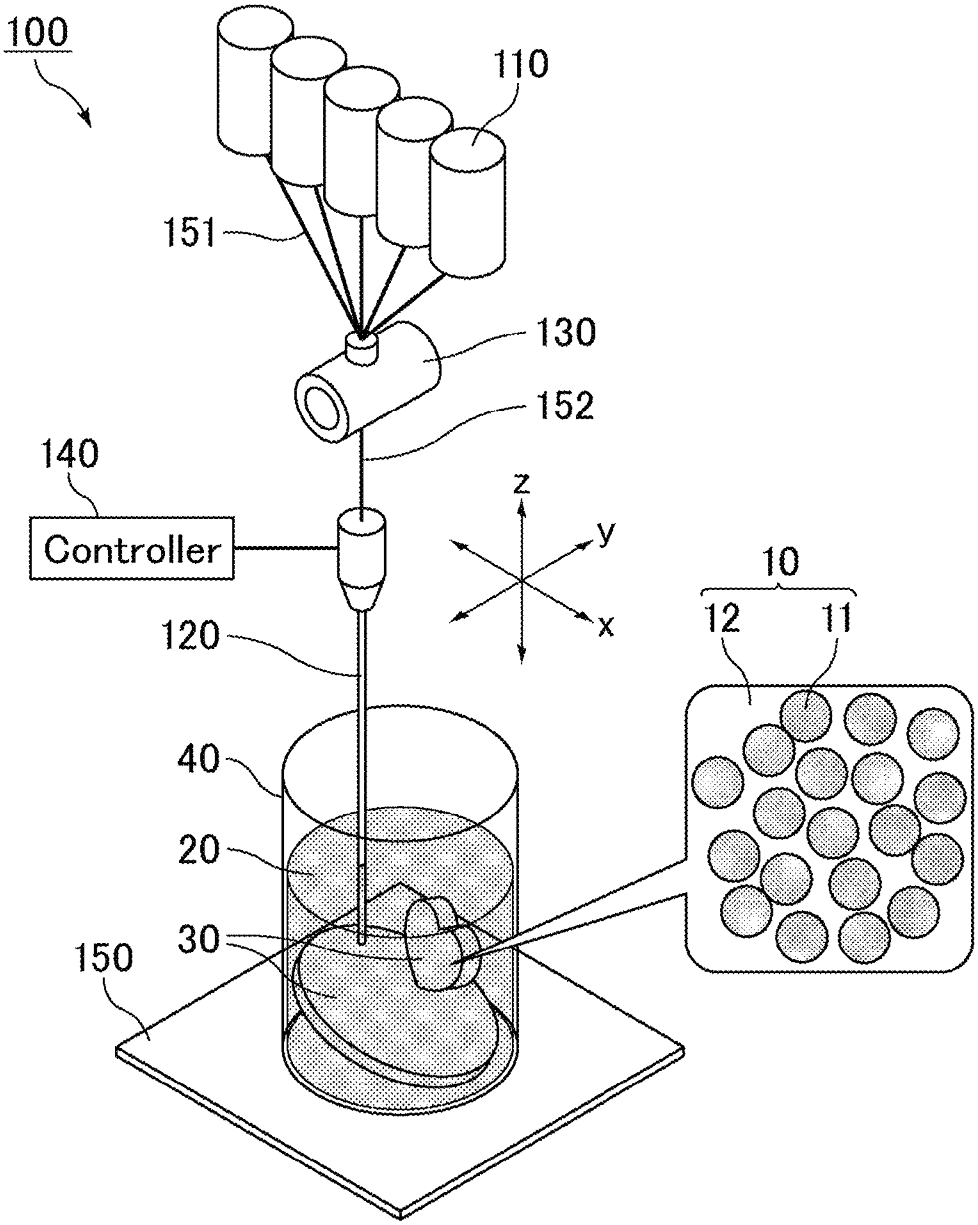
FIG. 3 is a conceptual diagram of a system for producing a pattern-containing liquid according to the present invention in which a pattern is formed in a liquid.

FIG. 3 is a conceptual diagram of the system for producing a pattern-containing liquid according to the present invention in which a pattern is formed in a liquid. A system for producing a pattern-containing liquid 100 shown in FIG. 3 includes: multiple tanks 110 each containing a pattern-forming material 10 in which micro-sized particles 11 are dispersed in a first liquid 12; a nozzle 120 configured to discharge the pattern-forming material 10; a pump 130 configured to deliver the pattern-forming material 10 to the nozzle 120; a controller 140; a stage 150 configured to bear a container 40 containing a second liquid 20; liquid delivery tubes 151 that connect the tanks 110 and the pump 130; and a liquid delivery tube 152 that connects the pump 130 and the nozzle 120. The controller 140 is configured to control the position of the nozzle 120 and the discharge flow rate of the pattern-forming material 10 to be discharged through the nozzle 120. The production system 100 can automatically form a pattern 30 from the micro-sized particles 11 in the second liquid 20. The tanks 110 may contain multiple, different types of pattern-forming materials 10, and such multiple types of pattern-forming materials 10 may be discharged through the nozzle 120 simultaneously or successively. The production system 100 may include multiple nozzles 120, and the multiple nozzles 120 may discharge multiple types of pattern-forming materials 10 simultaneously or successively.

Figure 4:
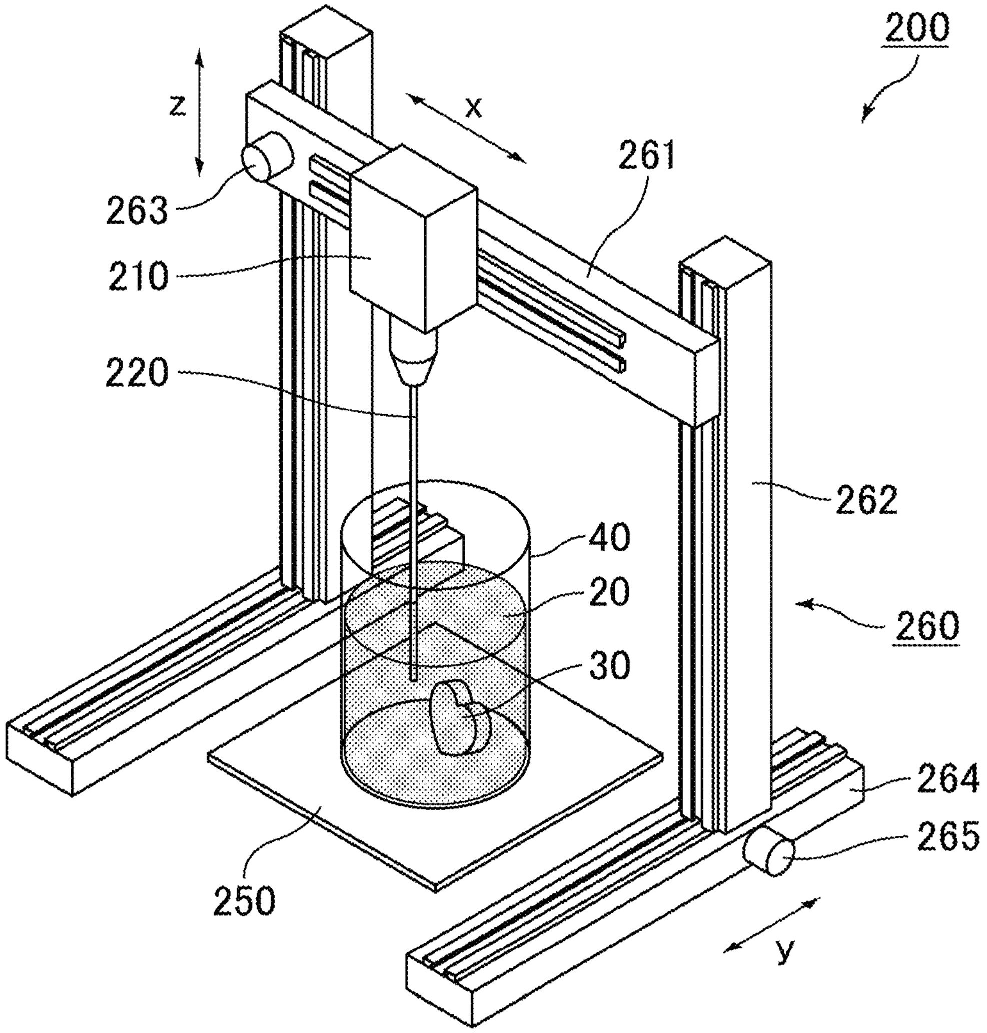
FIG. 4 is a conceptual diagram of a system for producing a pattern-containing liquid according to the present invention in which a gantry system is used.

FIG. 4 is a conceptual diagram of a system for producing a pattern-containing liquid according to the present invention in which a gantry system is used. A system for producing a pattern-containing liquid 200 shown in FIG. 4 includes: a tank 210 configured to contain a pattern-forming material (not shown) in which micro-sized particles (not shown) are dispersed in a first liquid (not shown); a nozzle 220 configured to discharge the pattern-forming material; a stage 250 configured to bear a container 40 containing a second liquid 20; and a gantry system 260 serving as a multi-axial mechanism of a controller (not shown). The tank 210 is integrated with a pump (not shown) configured to deliver the pattern-forming material to the nozzle 220 and an x-axial drive motor (not shown) of the gantry system 260. The gantry system 260 is a triaxial drive mechanism, and includes an x-axial rail 261 that supports the tank 210 movably along the x axis, z-axial rails 262 that support the x-axial rail 261 movably along the z axis, a z-axial drive motor 263 configured to drive the x-axial rail 261 supported by the z-axial rails 262 along the z axis, y-axial rails 264 that support the respective z-axial rails 262 movably along the y axis, and a y-axial drive motor 265 configured to drive the z-axial rails 262 supported by the respective y-axial rails 264 along the y axis. Under the control by the controller, the system can flexibly move the nozzle 220 along the three axes. The controller is configured to control the position of the nozzle 220 by use of the gantry system 260 and control the discharge flow rate of the pattern-forming material to be discharged through the nozzle 220. The production system 200 can also automatically form a pattern 30 from the micro-sized particles in the second liquid 20.

Figure 5:
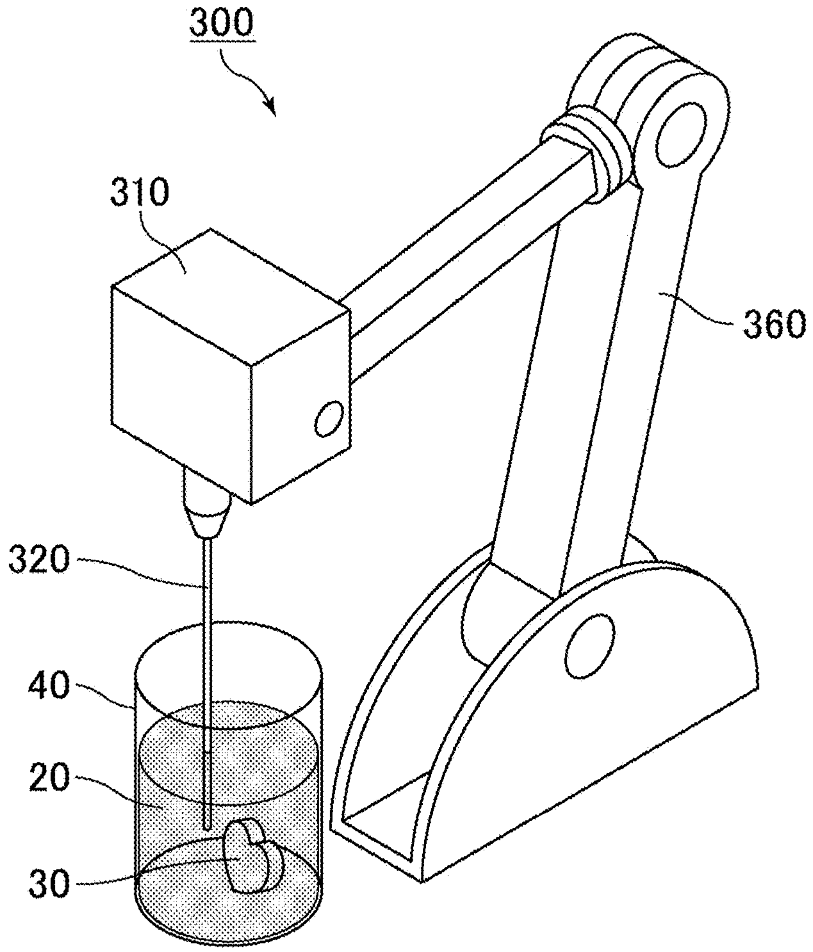
FIG. 5 is a conceptual diagram of a system for producing a pattern-containing liquid according to the present invention in which a robot arm is used.

FIG. 5 is a conceptual diagram of a system for producing a pattern-containing liquid according to the present invention in which a robot arm is used. A system for producing a pattern-containing liquid 300 shown in FIG. 5 includes: a tank 310 configured to contain a pattern-forming material (not shown) in which micro-sized particles (not shown) are dispersed in a first liquid (not shown); a nozzle 320 configured to discharge the pattern-forming material; and a robot arm 360 serving as a multi-axial mechanism of a controller (not shown). The tank 310 is integrated with a pump (not shown) configured to deliver the pattern-forming material to the nozzle 320. The robot arm 360 is, for example, an eight-axial drive mechanism and can flexibly move the nozzle 320 along the eight axes under the control by the controller. The controller is configured to control the position of the nozzle 320 by use of the robot arm 360 and control the discharge flow rate of the pattern-forming material to be discharged through the nozzle 320. The production system 300 can also automatically form a pattern 30 from the micro-sized particles in the second liquid 20.

Next, a method for producing a pattern-containing liquid according to the third aspect of the present invention (hereinafter, also simply referred to as a production method according to the third aspect) is described below. The features common to the production method according to the first aspect are applicable to the production method according to the third aspect and are therefore not elaborated hereinbelow.

The production method according to the third aspect includes discharging, using a position-controllable nozzle, a first liquid into a second liquid in which micro-sized particles containing an edible organic substance are dispersed, thereby forming a pattern from the first liquid.

The production method according to the third aspect includes discharging, using a position-controllable nozzle, a first liquid into a second liquid in which micro-sized particles containing an edible organic substance are dispersed, thereby forming a pattern from the first liquid. This can draw a pattern such as a letter or picture composed of the first liquid in the second liquid in which the micro-sized particles are dispersed, which serves as the field, and maintain its shape. Accordingly, the production method can provide a pattern-containing liquid with a flexibly designed pattern such as color vision, taste, flavor, mouthfeel, or texture. For example, introducing components such as a colorant, taste substance, and a flavor component into the first liquid enables designing of spatial color vision, taste, and flavor in the second liquid. Also, controlling the mouthfeel or texture of the first liquid enables designing of spatial mouthfeel or texture in the second liquid. Further, micro-designing of a pattern composed of the first liquid enables production of plant-based beverages with low environmental load having mouthfeel similar to that of beverages with high environmental load, such as real milk and coffee.

The micro-sized particles are micro-sized particles containing an edible organic substance. The micro-sized particles are micro-sized particles, preferably having a diameter of 0.13 μm or greater as described later. Thus, the micro-sized particles dispersed in the second liquid exhibit a limited diffusion due to their sizes and can remain, after the first liquid is discharged into the second liquid, around the original position for several tens of minutes to several tens of hours in a size-dependent manner. In other words, the first liquid discharged into the second liquid can also remain around the position where it is discharged for several tens of minutes to several tens of hours. As a result, a pattern-containing liquid can be produced in which a pattern composed of the first liquid is placed at any position in the second liquid.

As described above, the production method according to the first aspect and the production method according to the third aspect are different only in whether the micro-sized particles are discharged into a liquid or a liquid is discharged into another liquid in which the micro-sized particles are dispersed. The features described for the production method according to the first aspect are therefore appropriately applicable to the production method according to the third aspect. For example, the production method according to the third aspect may be used in any of the following embodiments.

The first liquid and the second liquid may be of any type and examples thereof include liquids in general. Specific examples thereof include those mentioned for the production method according to the first aspect. To make the pattern composed of the first liquid visually observable from the outside of the second liquid, the second liquid preferably has transparency that allows the pattern to be visually observable through the second liquid. From the same viewpoint, the second liquid may be either a colored or colorless, transparent liquid. The first liquid and the second liquid may be liquids of different types or may be liquids of the same type. The first liquid and the second liquid each may be a single type of liquid or may include multiple types of liquids which are mixed with or separated from each other.

The types of first liquid and the second liquid may be skin cosmetics such as perfume, skin toner, or lotion.

The types of the first liquid and the second liquid may be liquids suitable for cell growth and maintenance, such as culture media or buffers.

In the production method according to the third aspect, the first liquid needs not to contain micro-sized particles containing an edible organic substance.

One first liquid alone may be discharged into the second liquid in which the micro-sized particles are dispersed, or two first liquids may be simultaneously or successively discharged into the second liquid in which the micro-sized particles are dispersed.

The first liquid preferably contains at least one component selected from the group consisting of a colorant, a taste component, a nutrient, and a flavor component. The presence of these additives in the first liquid allows a pattern composed of the first liquid to have a design with a variety of spatial senses. For example, in the presence of a colorant, a pattern composed of the first liquid can exhibit a spatial color design; in the presence of a taste component, a pattern composed of the first liquid can provide a spatial taste design; in the presence of a nutrient, a pattern composed of the first liquid can provide a spatial nutrient design; and in the presence of a flavor component, a pattern composed of the first liquid can provide a spatial fragrant design. Examples of the colorant include a red colorant, green colorant, blue colorant, black colorant, and white colorant. Examples of the taste component include sucrose, fructose, table salt, glucose, amino acids, nucleic acids, acetic acid, malic acid, citric acid, caffeine, tannin, capsaicin, glycerol, and food extracts. Examples of the nutrient include vitamins, minerals, lipids, fatty acids, polypeptides, sugars, healthy material molecules, and food extracts. Examples of the flavor component include food flavoring compounds designated in Appended Table 1 of Ordinance for Enforcement of the Food Sanitation Act, such as vanillin, eugenol, geraniol, and citral, and food extracts. The first liquid may include multiple types of liquids which are different in terms of the presence or absence of colorant or in terms of the types of colorant contained (e.g., different colors). The same applies to the taste component, the nutrient, and the flavor component. The first liquid may include multiple types of liquids which are different in terms of the presence or absence of these additives or in terms of the types of additives contained.

In the case where the first liquid contains a coloring component (exhibits a color), the first liquid is to function as a pattern-forming ink.

The pattern may be any of a 1D pattern (line), a 2D pattern (plane), and a 3D pattern (solid). Examples of the pattern include, but are not limited to, those generating color vision such as signs, including letters, and pictures, those generating taste, mouthfeel, or texture, such as uneven distribution of components, and those generating these senses in combination.

The particle structure of the micro-sized particles may be, but is not limited to, a uniform structure, a core-shell structure, or a Janus structure.

The micro-sized particles are preferably insoluble or slightly soluble in the first liquid and the second liquid (it may be water). To make the pattern composed of the first liquid visually observable from the outside of the second liquid, the micro-sized particles may have transparency that allows the pattern to be visually observable through the micro-sized particles dispersed in the second liquid. From the same viewpoint, the micro-sized particles may be either a colored or colorless, transparent particles.

The micro-sized particles are preferably not chemically bonded to each other by a crosslinker. This makes it possible to avoid aggregation of a pattern composed of the micro-sized particles and thereby to easily drink the micro-sized particles together with the second liquid.

The diameter of the micro-sized particles may be 0.13 μm or greater, preferably 0.2 μm or greater and 1000 μm or smaller. The diameter of the micro-sized particles is more preferably 0.3 μm or greater, still more preferably 0.5 μm or greater, still more preferably 50 μm or smaller.

The ratio of the density of the micro-sized particles to the density of the second liquid (density of micro-sized particles/density of second liquid) is preferably 0.9 or higher and 1.1 or lower. In the case where this ratio is 0.9 or higher and 1.1 or lower, the micro-sized particles may less float or precipitate in the second liquid and therefore a pattern can be formed from the first liquid at any position in the second liquid. From this viewpoint, the ratio is more preferably 0.92 or higher and 1.08 or lower, still more preferably 0.95 or higher and 1.05 or lower.

The micro-sized particles may contain at least one component selected from the group consisting of a colorant, a taste component, a nutrient, and a flavor component. Specific examples of the colorant, taste component, nutrient, and flavor component include those mentioned for the production method according to the first aspect. The micro-sized particles may include multiple types of particles which are different in terms of the presence or absence of colorant or in terms of the types of colorant contained (e.g., different colors). The same applies to the taste component, the nutrient, and the flavor component. The micro-sized particles may include multiple types of particles which are different in terms of the presence or absence of these additives or in terms of the types of additives contained.

The micro-sized particles preferably contain at least one of silica (silicon dioxide) or titania (titanium dioxide).

The micro-sized particles may contain a hydrophobic substance or hydrophilic substance for maintaining the aforementioned additives such as colorant and silica in the micro-sized particles. The micro-sized particles may have a structure in which a layer containing a hydrophobic substance and a layer containing a hydrophilic substance are alternately arranged from the center to the outside, such as a trilayer structure of a hydrophilic substance, a hydrophobic substance, and a hydrophilic substance or of a hydrophobic substance, a hydrophilic substance, and a hydrophobic substance.

The micro-sized particles contain an edible organic substance. The edible organic substance is a substance that is to function as a main component for forming the shapes of the micro-sized particles. The edible organic substance may have any molecular weight, and the edible organic substance is preferably a high molecular weight substance.

The edible organic substance preferably includes at least one edible organic substance selected from the group consisting of a polysaccharide, polypeptide, higher alcohol, natural resin, lipid, higher fatty acid ester, polyphenol, polyvinyl alcohol, polyethylene glycol, and nucleic acid (DNA). Preferred specific examples of these edible organic substances include those mentioned for the first edible organic substance in the production method according to the first aspect. Similarly to the case of the production method according to the first aspect, one preferred specific example of the edible organic substance may be used alone or two or more of these may be used in combination. For the above preferred specific examples of the components in different categories, such as a polysaccharide and a polypeptide, two or more of these may be used in combination.

The micro-sized particles may be cells such as human-derived cells, animal cells, plant cells, and microbial cells. Using these cells as the micro-sized particles allows the second liquid with the micro-sized particles dispersed therein to have a variety of physiological functions. Note that these cells contain an edible organic substance.

The micro-sized particles may aggregate each other in a noncovalent manner to generate mouthfeel or texture.

The volume percent concentration of the micro-sized particles in the second liquid may be, but is not limited to, preferably 0.05% by volume or more and 74% by volume or less, more preferably 0.1% by volume or more and 60% by volume or less, still more preferably 0.5% by volume or more and 50% by volume or less.

The "volume percent concentration of the micro-sized particles in the second liquid" as used herein can be determined by the coulter counter method.

Similarly to the case of the production method according to the first aspect, to maintain a pattern composed of the first liquid in the second liquid for a long term, the first liquid is preferably one compatible with the second liquid, and may be the same liquid as the second liquid or a liquid similar to the second liquid.

The ratio of the density of the second liquid to the density of the first liquid (density of second liquid/density of first liquid) is preferably 0.9 or higher and 1.1 or lower. In the case where this ratio is 0.9 or higher and 1.1 or lower, a pattern composed of the first liquid may less float or precipitate in the second liquid. From this viewpoint, the ratio is more preferably 0.92 or higher and 1.08 or lower, still more preferably 0.95 or higher and 1.05 or lower.

The first liquid and the second liquid preferably have an absolute difference in moisture content of 0% or greater and 50% or smaller. This absolute difference therebetween is more preferably 25% or smaller, still more preferably 15% or smaller. In common cases, the moisture content of the first liquid is greater than the moisture content of the second liquid.

The first liquid and the second liquid each preferably have a viscosity of 0.8 mPa·s or higher and 6 Pa·s or lower at 25 °C. In the case where they each have a viscosity of 0.8 mPa·s or higher and 6 Pa·s or lower at 25 °C, diffusion of the first liquid in the second liquid can be easily reduced. This allows a pattern composed of the first liquid to maintain its shape in the second liquid for a longer term. From this viewpoint, the viscosity of each of them is more preferably 3 Pa·s or lower, still more preferably 1 Pa·s or lower at 25 °C. In an embodiment, the viscosity of the first liquid and the viscosity of the second liquid are each preferably 1 mPa·s or higher and 100 mPa·s or lower, more preferably 1 mPa·s or higher and 50 mPa·s or lower at 25 °C. The viscosity of the first liquid may be higher than the viscosity of the second liquid or vice versa, or they may be substantially equal to each other.

The nozzle is a hollow pipe having an opening at each end. The first liquid is introduced through the proximal end of the nozzle, passed through the hollow inside the nozzle, and then discharged through the distal end of the nozzle. The three-dimensional position of the nozzle and the discharge flow rate of the first liquid discharged through the distal end of the nozzle are commonly controlled by a controller of a system for producing a pattern-containing liquid to be described later. Any number of nozzles, such as one nozzle or multiple nozzles, may be used.

The nozzle is preferably flexibly movable along multiple axes (e.g., three or more axes and eight or less axes). Not only the nozzle but also a container of the second liquid may be moved.

Preferably, the second liquid is contained in a container (e.g., glass or cup) and the nozzle has a length that is at least greater than the depth of the second liquid contained in the container.

The nozzle diameter L (m) and the nozzle speed U (m/s) in the second liquid preferably satisfy the relationship $U \times L \leq 10^{-3}$ $m^3/s$, more preferably satisfy the relationship $U \times L \leq 5 \times 10^{-4}$ $m^2/s$, still more preferably the relationship $U \times L \leq 10\text{-}4$ $m^2/s$.

The ratio (X/A)/U of a value obtained by dividing the discharge flow rate X ($m^3/s$) of the first liquid discharged through the nozzle by the opening area A ($m^2$) at the distal end of the nozzle to the speed U (m/s) of the nozzle in the second liquid is preferably 0.2 or higher and 10 or lower, more preferably 0.3 or higher and 8 or lower, still more preferably 0.4 or higher and 5 or lower.

The distal end of the nozzle may have any opening shape. The nozzle preferably has a circular, elliptic, triangular, rectangular, square, rhombic, V-shaped, U-shaped, or C-shaped distal end.

Next, a system for producing a pattern-containing liquid according to a fourth aspect of the present invention (hereinafter, also simply referred to as a production system according to the fourth aspect) is described below. The features common to the production method and production system according to the aforementioned aspects are applicable to the production system according to the fourth aspect and are therefore not elaborated hereinbelow.

The production system according to the fourth aspect relates to a system for producing a pattern-containing liquid in which a pattern is formed in a liquid, the system including: a tank configured to contain a first liquid; a nozzle configured to discharge the first liquid; a pump configured to deliver the first liquid to the nozzle; and a controller configured to control a position of the nozzle and an discharge flow rate of the first liquid to be discharged through the nozzle, wherein the controller allows the nozzle to discharge the first liquid while allowing the nozzle to move in a second liquid in which micro-sized particles containing an edible organic substance are dispersed. This allows the pump to feed the first liquid from the tank to the nozzle and allows the nozzle to discharge the first liquid to any position in the second liquid in which micro-sized particles are dispersed while the controller is allowed to control the position of the nozzle and the discharge flow rate of the first liquid discharged. The discharge flow rate of the first liquid to be discharged can be controlled by changing the pump pressure or the pressure inside the nozzle in response to voltage application to, for example, a piezoelectric element disposed at a nozzle portion. Accordingly, a pattern-containing liquid can be automatically produced by designing a pattern using software such as CAD and controlling the nozzle based on this design. In other words, the production system can produce a pattern-containing liquid having a higher flexibility in designing, in liquid, a pattern that can generate any sense such as color vision, taste, flavor, mouthfeel, or texture. Also, micro-designing of a pattern composed of a first liquid enables production of a plant-based beverage with low environmental load having mouthfeel similar to that of beverages with high environmental load, such as real milk and coffee.

The controller allows the nozzle to discharge the first liquid while allowing the nozzle to move in the second liquid so as to satisfy the relationship $U \times L \leq 10^{-3}$ $m^2/s$, wherein L represents the diameter (m) of the nozzle and U represents the speed (m/s) of the nozzle. As described for the production method according to the first aspect, this enables effective reduction in generation of a turbulent flow by the nozzle and formation of a clear pattern having a desired shape. From this viewpoint, the nozzle diameter L (m) and the nozzle speed U (m/s) in the second liquid more preferably satisfy the relationship $U \times L \leq 5 \times 10^{-4}$ $m^2/s$, still more preferably the relationship $U \times L \leq 10^{-4}$ $m^2/s$.

From the same viewpoint as in the production method according to the first aspect, the ratio (X/A)/U of a value obtained by dividing the discharge flow rate X ($m^3/s$) of the first liquid discharged through the nozzle by the opening area A ($m^2$) at the distal end of the nozzle to the speed U (m/s) of the nozzle in the second liquid is preferably 0.2 or higher and 10 or lower, more preferably 0.3 or higher and 8 or lower, still more preferably 0.4 or higher and 5 or lower.

The first liquid contained in the tank may be delivered to the nozzle through a liquid delivery tube. The tank may be any container that can contain the first liquid. The tank may be separate from the pump and the nozzle or may be integrated with the pump and the nozzle. Multiple tanks may be provided in accordance with the type of the first liquid.

The nozzle is as described for the production method according to the third aspect. The nozzle may be coupled with a piezoelectric element, for example. The pressure inside the nozzle may be changed by applying voltage to this piezoelectric element, thereby controlling the discharge flow rate of the first liquid discharged from the nozzle.

The pump may be any pump that can deliver the first liquid to the nozzle, such as a syringe pump or a peristaltic pump.

The controller may be provided with a multi-axial mechanism (e.g., a mechanism having three or more and eight or less axes) coupled with the nozzle and configured to move the position of the nozzle. Examples of the multi-axial mechanism to be used include a gantry system (e.g., three axes) and a robot arm (e.g., eight axes).

To control the discharge flow rate of the first liquid discharged, the controller may control the pump pressure or may control the voltage applied to a piezoelectric element provided at the nozzle portion.

The controller may be further provided with a control processor that executes control-processing of components such as the nozzle, the pump, and the multi-axial mechanism. The control processor may include, for example, a software program for executing a variety of processing operations such as control-processing, a CPU for executing the software program, and a variety of hardware devices (e.g., memory) controlled by the CPU. The software program (e.g., control program using 3D-CAD data) and data for operating the control processor are stored in the memory. The control processor may be provided together with the multi-axial mechanism at a place where a pattern-containing liquid is to be produced (e.g., in the same store), or an element related to at least one function of the control processor may be separately provided at a place different from the production site for a pattern-containing liquid (e.g., cloud).

The production system according to the fourth aspect may further include a stage that can bear a container containing the second liquid, and the stage may be movably arranged. The controller may allow the nozzle to discharge the first liquid into the second liquid while allowing not only the nozzle but also the stage, i.e., the second liquid contained in a container, to move.

The systems for producing a pattern-containing liquid as shown in FIG. 3 to FIG. 5 are applicable to the production system according to the fourth aspect.

Hereinabove, some aspects are described in which a pattern-containing liquid, such as a pattern-containing beverage is produced from micro-sized particles. Still, the present invention is also applicable to production of not only beverage products but also cosmetics.

Specifically, a method for producing a pattern-containing cosmetic according to another aspect of the present invention may include, for example, discharging, using a position-controllable nozzle, a pattern-forming material in which first micro-sized particles are dispersed in a first liquid into a second liquid, thereby forming a pattern from the first micro-sized particles.

A method for producing a pattern-containing cosmetic according to still another aspect of the present invention may include, for example, discharging, using a position-controllable nozzle, a first liquid into a second liquid in which micro-sized particles are dispersed, thereby forming a pattern from the first solution.

The features of the micro-sized particles and the liquids described for the methods for producing pattern-containing liquids according to the first to fourth aspects are appropriately applicable to the methods for producing pattern-containing cosmetics and the methods for producing pattern-containing beverages according to the latter aspects.

The micro-sized particles and liquids used in the methods for producing pattern-containing cosmetics according to these aspects may be materials commonly usable for cosmetics.

Hereinbelow, the present invention is more specifically described with reference to validation experiments. The following validation experiments include experiments where micro-sized particles containing a non-edible organic substance were used. In this respect, micro-sized particles exhibit the same behavior in a liquid regardless of their edibility, so that the following results seem to be obtained also in the cases of using micro-sized particles containing an edible organic substance. The present invention is not limited to these validation experiments.

Validation Experiment 1

Figure 6:
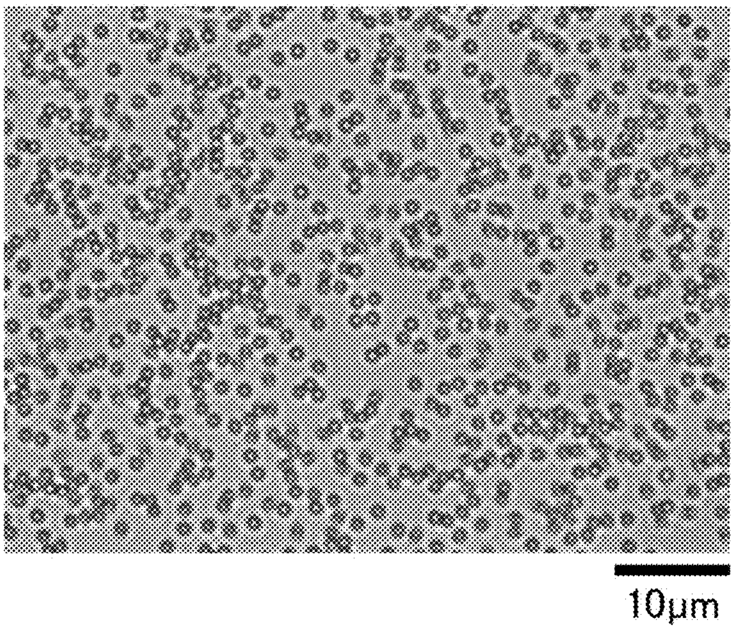
FIG. 6 is an optical micrograph of a 10% by volume suspension of micro-sized particles in Validation Experiment 1.

The shape of micro-sized particles was observed using an optical microscope. First, an aqueous suspension of 1-μm-diameter polystyrene micro-sized particles at a concentration of 2.4% by volume (Polystyrene Red Dyed Microsphere 1.00 μm, available from Polysciences Inc.) was centrifuged at 18500×g for one minute, so that the suspension was concentrated into a 10% by volume suspension of the micro-sized particles. This suspension was observed under the bright field using an optical microscope (ECLIPSE N, available from Nikon Corp.) with a 40×objective and a cold CCD camera (Orca-Flash 2.8, available from Hamamatsu Photonics K.K.). FIG. 6 is an optical micrograph of the 10% by volume suspension of the micro-sized particles in Validation Experiment 1. Consequently, as shown in FIG. 6, well-dispersed 1-μm-diameter spherical structures were observed as micro-sized particles.

Validation Experiment 2

Movement of micro-sized particles was examined in a solution having a density similar to the density of the micro-sized particles. First, an aqueous suspension of 1-μm-diameter polystyrene micro-sized particles (Polystyrene Red Dyed Microsphere 1.00 μm, available from Polysciences Inc.) were mixed with a glycerol aqueous solution at various concentrations to a final concentration of 0.005% by volume ($9.1\times10^7$ particles/mL), followed by centrifugation at 18500×g for one minute. As a result, precipitation of the micro-sized particles was observed in the glycerol aqueous solution at a concentration of lower than 20% by volume. This seems to mean that the density of the micro-sized particles was similar to that of the 20% by volume glycerol aqueous solution (1.06 g/$cm^3$). Note that the density of the solution was measured using a density meter (DMA 4500 M, available from Anton Paar GmbH).

Figure 7:
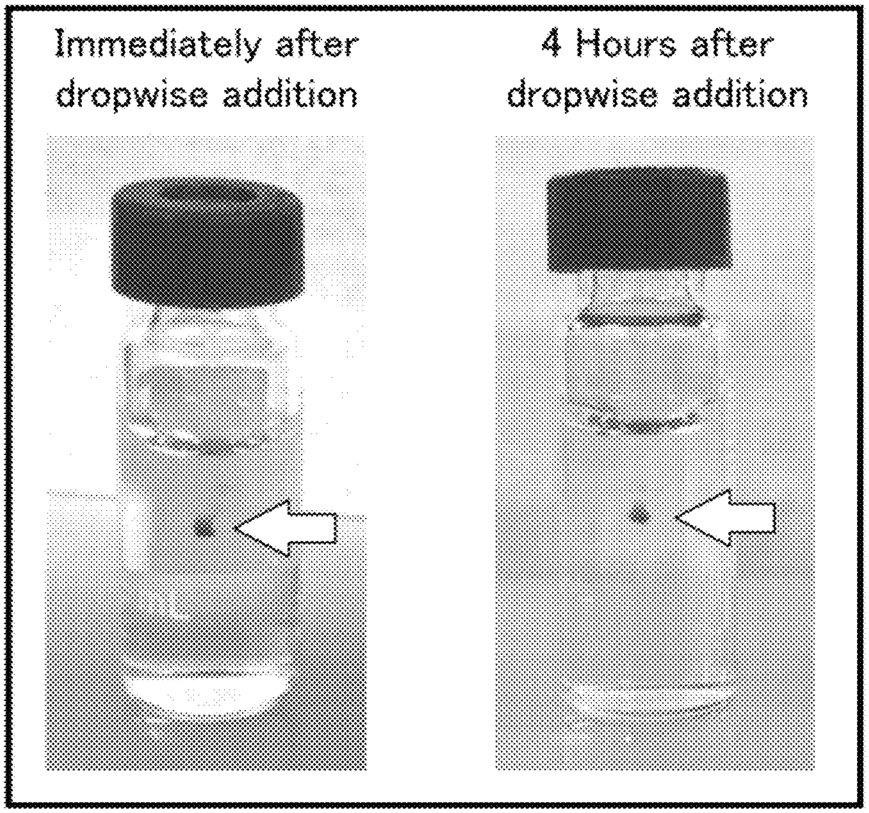
FIG. 7 includes photographs of a suspension of 1-μm-diameter micro-sized particles added dropwise to a 20% by volume glycerol aqueous solution in Validation Experiment 2.

The aqueous suspension of the micro-sized particles was then dispersed and suspended in a 20% by volume glycerol aqueous solution to a concentration of 0.5% by volume ($9.1\times10^9$ particles/mL). A 0.5-μL portion of the resulting suspension of the micro-sized particles (hereinafter also referred to as a micro-sized particle liquid A1) was added dropwise to 1.5 mL of a 20% by volume glycerol aqueous solution and left at room temperature. Diffusion of the micro-sized particles was then observed. FIG. 7 includes photographs of the suspension of the 1-μm-diameter micro-sized particles added dropwise to the 20% by volume glycerol aqueous solution in Validation Experiment 2. Consequently, as shown in FIG. 7, the micro-sized particles were merely slightly dispersed after a lapse of four hours. This suggests that the suspension of the micro-sized particles may be used as a pattern-forming material (e.g., ink) to form a pattern (e.g., an image) in a solution.

Validation Experiment 3

Figure 8:
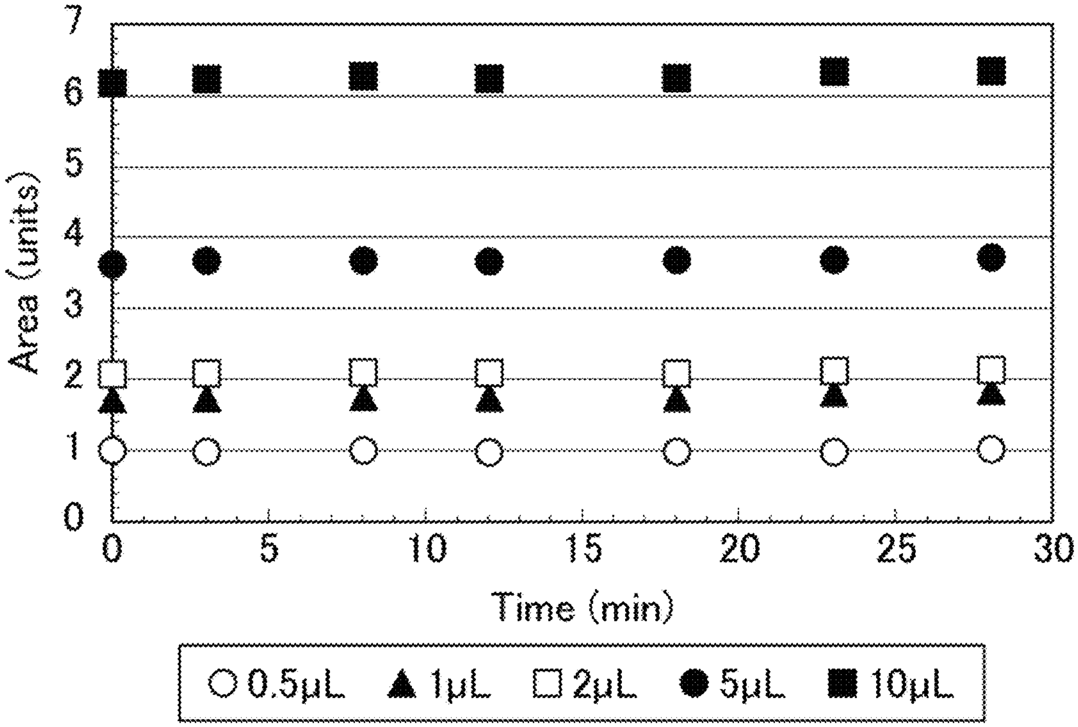
FIG. 8 is a graph of diffusion in Validation Experiment 3 where a suspension of 1-μm-diameter micro-sized particles were added dropwise in various amounts to a 20% by volume glycerol aqueous solution.
Figure 9:
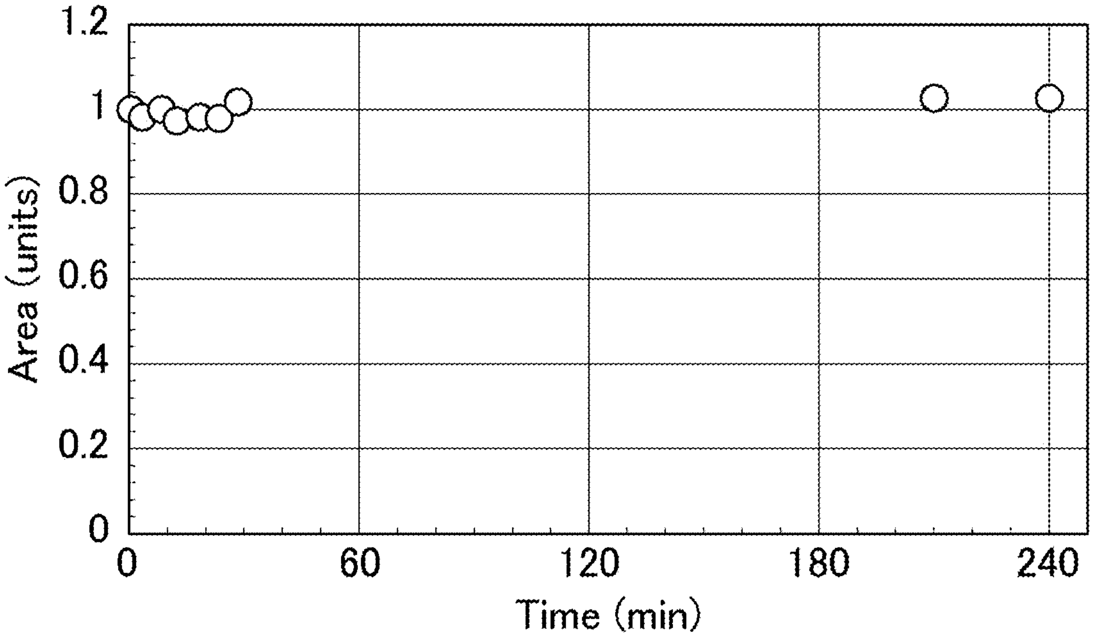
FIG. 9 is a graph of diffusion in Validation Experiment 3 where 0.5 μL of a 0.5% by volume suspension of 1-μm-diameter micro-sized particles was added dropwise to a 20% by volume glycerol aqueous solution and left for four hours.

The micro-sized particle liquid A1 prepared in Validation Experiment 2 was used to examine the dependence of diffusion of the micro-sized particle liquid on the amount thereof added dropwise. First, 0.5-μL to 10-μL portions of this micro-sized particle liquid were added dropwise to respective 1.5-mL portions of a 20% by volume glycerol aqueous solution and left at room temperature. Diffusion of the micro-sized particles was then video recorded and the area of the micro-sized particle liquid A1 observed in the video was determined using image-processing software (ImageJ (NIH)) by binarizing an image to be analyzed at a threshold of 129 and calculating the number of pixels. The areas of the micro-sized particle liquid A1 under the respective conditions were each calculated as the ratio to the area calculated under the condition where the concentration of the micro-sized particles was 0.5% by volume at the start of measurement and the amount of the liquid added dropwise was 0.5 μL, which is taken as 1. FIG. 8 is a graph of diffusion in Validation Experiment 3 where the suspension of the 1-μm-diameter micro-sized particles were added dropwise in various amounts to the 20% by volume glycerol aqueous solution. FIG. 9 is a graph of diffusion in Validation Experiment 3 where 0.5 μL of the 0.5% by volume suspension of the 1-μm-diameter micro-sized particles was added dropwise to the 20% by volume glycerol aqueous solution and left for four hours. Consequently, as shown in FIG. 8, the areas under the respective conditions after a lapse of 30 minutes exhibited increments of at most 7% or less of the initial value. Further, as shown in FIG. 9, the area of the sample added dropwise in an amount of 0.5 μL exhibited an increment of 3% or less of the initial value after a lapse of four hours. These results demonstrate that the images composed of the micro-sized particles hardly depend on the amount of the suspension of the micro-sized particles used and that a pattern (e.g., an image) can be stably formed in the solution using the micro-sized particles.

Validation Experiment 4

Pattern-forming materials (inks) containing micro-sized particles having different particle sizes and different concentrations were used to form an image. First, an aqueous suspension of 0.2-μm-diameter polystyrene micro-sized particles (Polystyrene Red Dyed Microsphere 0.20 μm, available from Polysciences Inc.) was mixed with a glycerol aqueous solution at respective concentrations to a final concentration of 0.005% by volume ($9.1\times10^7$ particles/mL), followed by centrifugation at 18500×g for one minute. As a result, precipitation of the micro-sized particles was observed in the glycerol aqueous solution at a concentration of lower than 20% by volume. This seems to mean that the density of the micro-sized particles was similar to that of the 20% by volume glycerol aqueous solution (1.06 g/cm$^3$). Note that the density of the solution was measured using a density meter (DMA 4500 M, available from Anton Paar GmbH).

Figure 10:
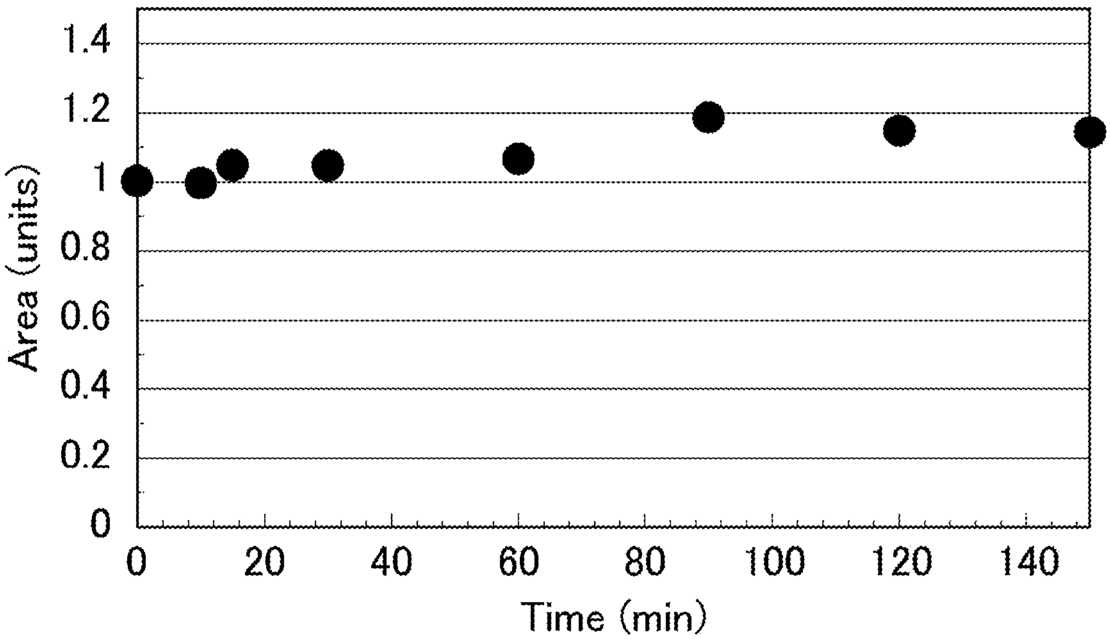
FIG. 10 is a graph of diffusion in Validation Experiment 4 where a suspension of 0.2-μm-diameter micro-sized particles was added dropwise to a 20% by volume glycerol aqueous solution.

Next, the aqueous suspension of the 0.2-μm-diameter micro-sized particles was dispersed and suspended in a 20% by volume glycerol aqueous solution, whereby a 1% by volume ($2.2\times10^{12}$ particles/mL) suspension of the micro-sized particles (hereinafter, also referred to as a micro-sized particle liquid A2) was prepared. Then, a 1-μL portion of this micro-sized particle liquid was added dropwise to 1.5 mL of a 20% by volume glycerol aqueous solution and left at room temperature. Diffusion of the micro-sized particles was then video recorded and the area of the micro-sized particle liquid A2 observed in the video was determined using image-processing software (ImageJ (NIH)) by binarizing an image to be analyzed at a threshold of 129 and calculating the number of pixels. The areas of the micro-sized particle liquid A2 under the respective conditions were each calculated as the ratio to the area obtained by adding dropwise the micro-sized particles at the start of measurement, which is taken as 1. FIG. 10 is a graph of diffusion in Validation Experiment 4 where the suspension of the 0.2-μm-diameter micro-sized particles was added dropwise to the 20% by volume glycerol aqueous solution. Consequently, as shown in FIG. 10, the particles maintained their floating state after a lapse of 150 minutes and the area thereof was about 14% of the initial value. These results demonstrate that a pattern (e.g., an image) composed of the small, 0.2-μm-diameter micro-sized particles was stable in the solution for several hours.

Validation Experiment 5>

Figure 11:
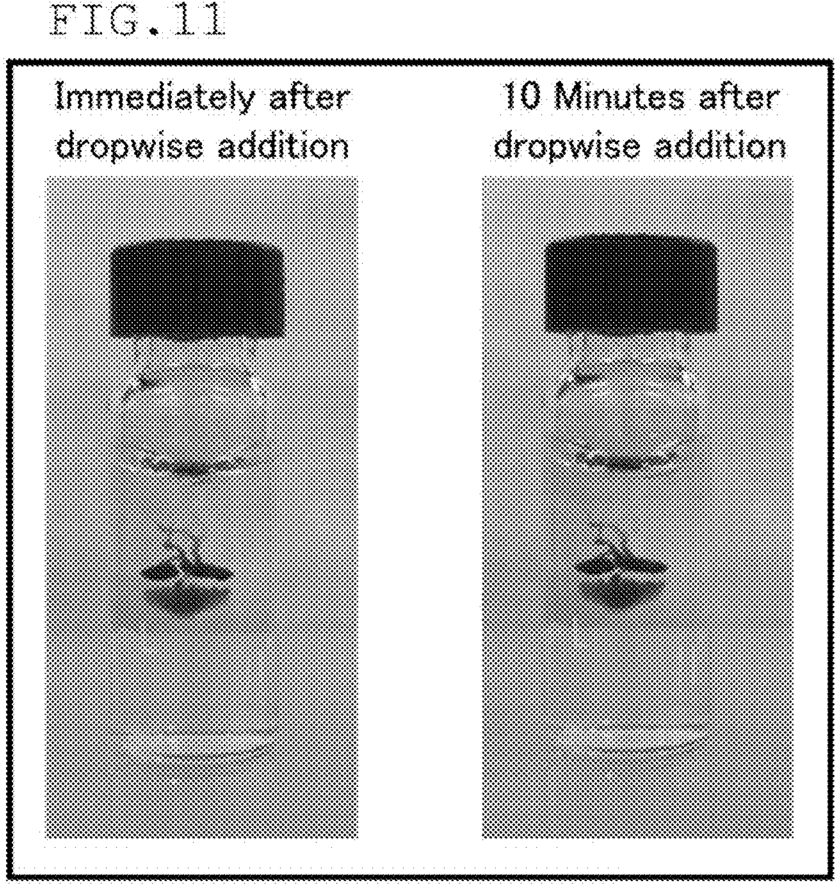
FIG. 11 includes photographs of an image constructed from a suspension of 1-μm-diameter micro-sized particles in a 20% by volume glycerol aqueous solution in Validation Experiment 5.

An ink containing micro-sized particles was used to form an image. An aqueous suspension of 1-μm-diameter polystyrene micro-sized particles (Polystyrene Red Dyed Microsphere 1.00 μm, available from Polysciences Inc.) was dispersed and suspended in a 20% by volume glycerol aqueous solution such that the concentration was 5% by volume ($9.1\times10^{10}$ particles/mL), whereby a suspension of the micro-sized particles was prepared. This suspension of the micro-sized particles was used to paint three areas in the 20% by volume glycerol aqueous solution. FIG. 11 includes photographs of an image constructed from the suspension of the 1-μm-diameter micro-sized particles in the 20% by volume glycerol aqueous solution in Validation Experiment 5. As shown in FIG. 11, the suspension of the micro-sized particles maintained the image after a lapse of 10 minutes, which demonstrates that the suspension of the micro-sized particles can stably form an image in a solution.

Validation Experiment 6

Pattern-forming materials (inks) containing micro-sized particles having different particle sizes and different concentrations were used to form an image. First, an aqueous suspension of 45-μm-diameter or 90-μm-diameter polystyrene micro-sized particles (Fluoresbrite Plain Microspheres 45 μm YG, available from Polysciences Inc. or Fluoresbrite Plain Microspheres 90 μm YG, available from Polysciences Inc.) was mixed with a glycerol aqueous solution at respective concentrations to a final concentration of 1.4% by volume (45 μm: $3.0\times10^5$ particles/mL, 90 μm: $3.8\times10^4$ particles/mL), followed by centrifugation at 18500×g for one minute. As a result, precipitation of the micro-sized particles was observed in the glycerol aqueous solution at a concentration of lower than 20% by volume. This seems to mean that the density of the micro-sized particles was similar to that of the 20% by volume glycerol aqueous solution (1.06 g/cm$^3$). Note that the density of the solution was measured using a density meter (DMA 4500 M, available from Anton Paar GmbH).

Figure 12:
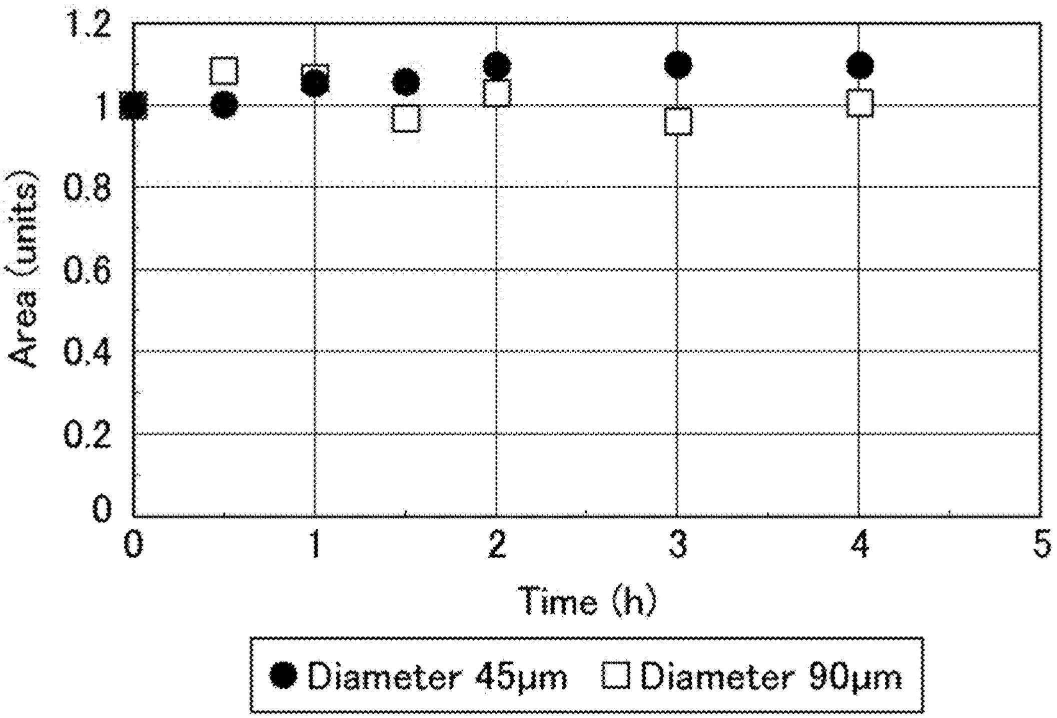
FIG. 12 is a graph of diffusion in Validation Experiment 6 where 1 μL of a 1.4% by volume suspension of 45-μm-diameter or 90-μm-diameter micro-sized particles was added dropwise to a 20% by volume glycerol aqueous solution and left for four hours.

Next, the aqueous suspension of the 45-μm-diameter or 90-μm-diameter micro-sized particles was dispersed and suspended in a 20% by volume glycerol aqueous solution, whereby a 1.4% by volume (45 μm: $3.0\times10^5$ particles/mL, 90 μm: $3.8\times10^4$ particles/mL) suspension of the micro-sized particles (hereinafter, also referred to as a micro-sized particle liquid A3 or a micro-sized particle liquid A4) was prepared. Then, a 1-μL portion of this micro-sized particle liquid was added dropwise to 1.5 mL of a 20% by volume glycerol aqueous solution and left at room temperature. Diffusion of the micro-sized particles was then video recorded and the area of the micro-sized particle liquid A3 or the micro-sized particle liquid A4 observed in the video was determined using image-processing software (ImageJ (NIH)) by binarizing an image to be analyzed at a threshold of 129 and calculating the number of pixels. The areas of the micro-sized particle liquid A3 or the micro-sized particle liquid A4 were each calculated as the ratio to the area obtained by adding dropwise the micro-sized particles at the start of measurement, which is taken as 1. FIG. 12 is a graph of diffusion in Validation Experiment 6 where the suspension of the 45-μm-diameter or 90-μm-diameter micro-sized particles was added dropwise to the 20% by volume glycerol aqueous solution and left for four hours. Consequently, as shown in FIG. 12, the particles maintained their floating state after a lapse of four hours and the area thereof was about 10% of the initial value. These results demonstrate that a pattern (e.g., an image) composed of the large, 45-μm-diameter or 90-μm-diameter micro-sized particles was stable in the solution for several hours.

Comparative Validation Experiment 1>

Figure 13:
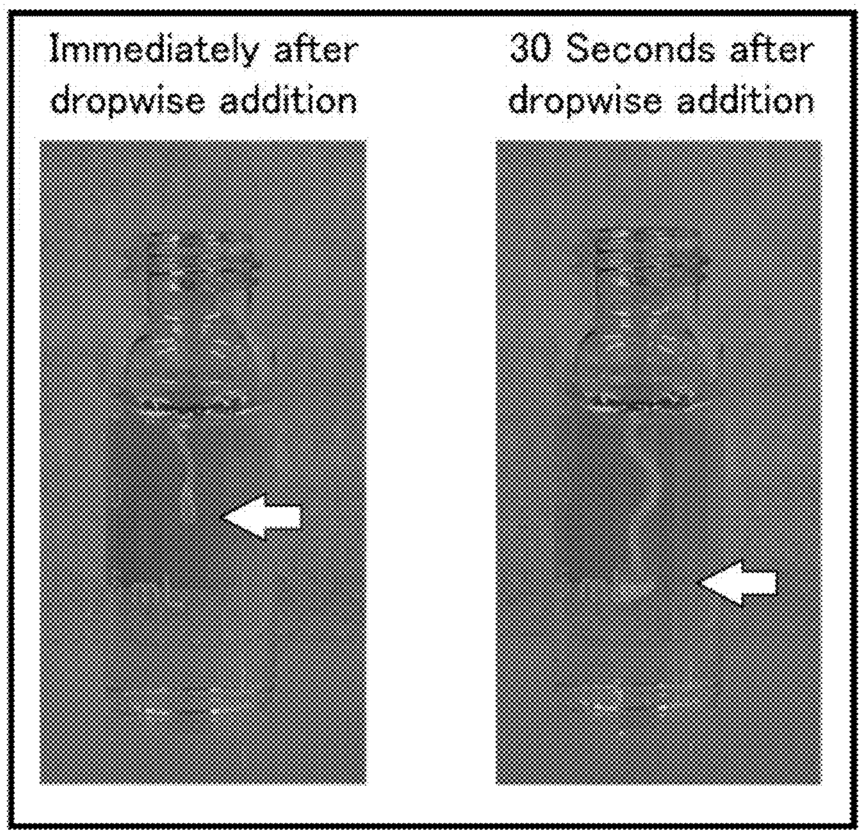
FIG. 13 includes photographs of a 18 by weight uranine solution added dropwise to a 20% by volume glycerol aqueous solution.

A low molecular weight compound was added dropwise so as to confirm that an image was not maintained. First, to 1.5 mL of a 20% by volume glycerol aqueous solution was added dropwise 1 μL of an aqueous solution of 1% by weight uranine (CAS No. 518-47-8, molecular weight 376) whose density was adjusted to be equal to that of the glycerol aqueous solution. FIG. 13 includes photographs of the 1% by weight uranine solution added dropwise to the 20% by volume glycerol aqueous solution. Consequently, as shown in FIG. 13, the uranine was observed to float immediately after the dropwise addition, but then to disperse and move rapidly within 30 seconds. This demonstrates that a solution of a low molecular weight compound has difficulty in forming an image in a liquid.

Validation Experiment 7

A pattern-forming material (ink) containing micro-sized particles of agarose, which is an edible material (edible organic substance), was used to form an image. The present validation experiment corresponds to an example of the present invention. First, to replace the solvent of a 20% ethanol suspension of 90-μm-diameter micro-sized agarose particles (density 1.05 g/cm$^3$) (Blocked agarose beads (binding control), available from Chromotek GmbH), 100 μL of this suspension of the micro-sized agarose particles was added to 1 mL of a 20% by volume glycerol aqueous solution, followed by centrifugation at 2000×g for 10 seconds. The resulting precipitate was re-suspended in 1 mL of a 20% by volume glycerol aqueous solution and the suspension was centrifuged at 2000×g for 10 seconds, which were repeated twice. The precipitate was finally re-suspended in 100 μL of a 20% by volume glycerol aqueous solution, whereby a suspension of the 90-μm-diameter micro-sized agarose particles (hereinafter, also referred to as a micro-sized particle liquid E1) was obtained.

Figure 14:
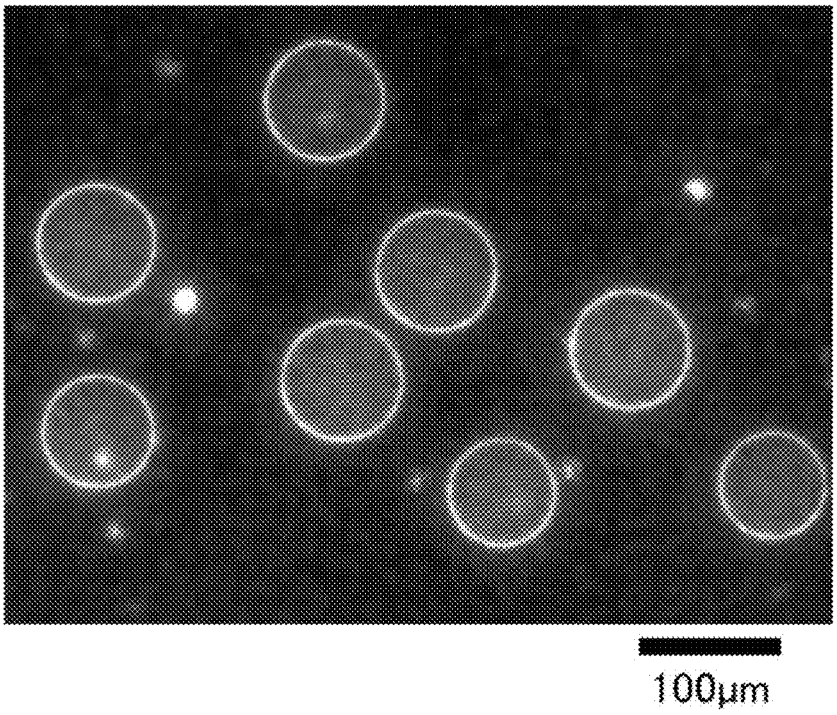
FIG. 14 is an optical micrograph of a suspension of micro-sized agarose particles in Validation Experiment 7.

Next, the shape of the micro-sized agarose particles was observed using an optical microscope. The micro-sized particle liquid E1 was observed under the bright field using an optical microscope (ECLIPSE N, available from Nikon Corp.) with a 10×objective and a cold CCD camera (Orca-Flash 2.8, available from Hamamatsu Photonics K.K.). FIG. 14 is an optical micrograph of the suspension of the micro-sized agarose particles in Validation Experiment 7. Consequently, as shown in FIG. 14, well-dispersed 90-μm-diameter spherical structures were observed as micro-sized particles.

Next, the micro-sized particle liquid E1 was used to examine the dependence of diffusion of the edible micro-sized particle liquid on the amount thereof added dropwise. First, 1-μL to 10-μL portions of this micro-sized particle liquid were added dropwise to 5-mL portions of a 20% by volume glycerol aqueous solution and left at room temperature. Diffusion of the micro-sized particles was then imaged from the above. The diameter of each portion of the micro-sized particle liquid E1 observed in the image was measured and the measured diameter was used to calculate the area of each portion of the micro-sized particle liquid E1. The areas of the micro-sized particle liquid E1 were each calculated as the ratio to the area obtained by adding dropwise 1 μL of the micro-sized particle liquid at the start of measurement, which is taken as 1.

Figure 15:
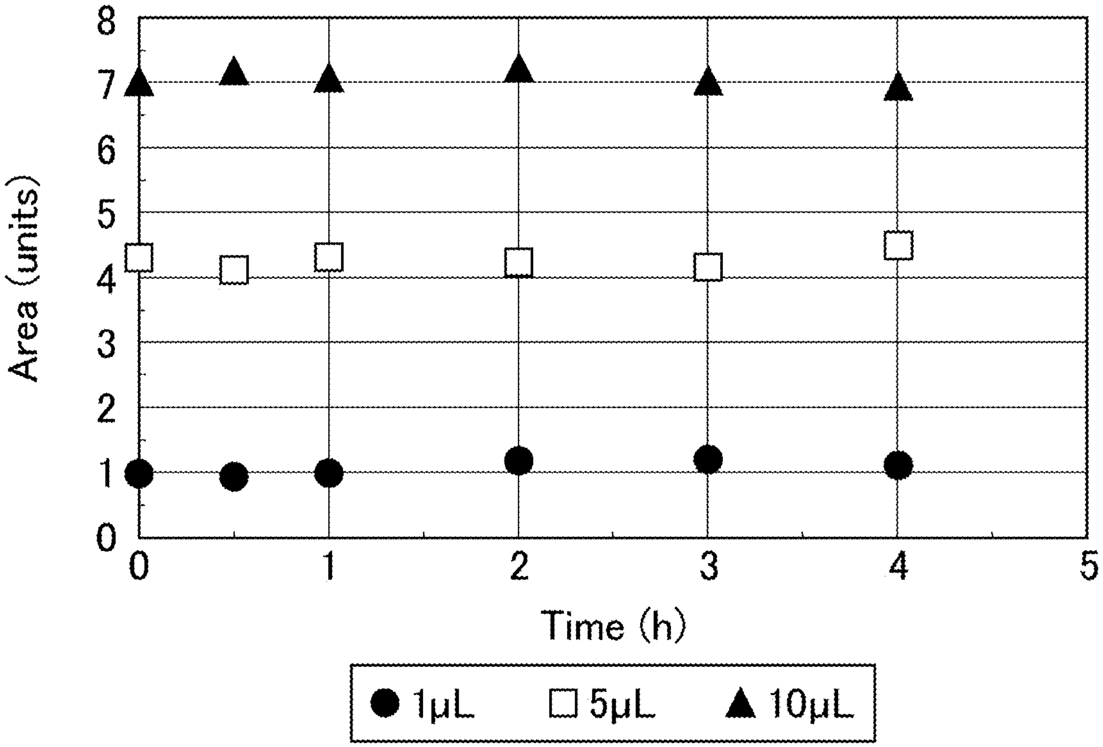
FIG. 15 is a graph of diffusion in Validation Experiment 7 where a suspension of 90-μm-diameter micro-sized agarose particles was added dropwise to a 20% by volume glycerol aqueous solution and left for four hours.

FIG. 15 is a graph of diffusion in Validation Experiment 7 where the suspension of the 90-μm-diameter micro-sized agarose particles was added dropwise to the 20% by volume glycerol aqueous solution and left for four hours. Consequently, as shown in FIG. 15, the area exhibited an increment of at most about 10% of the initial value after a lapse of four hours. These results demonstrate that a pattern (e.g., an image) composed of the 90-μm-diameter edible micro-sized particles was stable in the solution for several hours.

Comparative Validation Experiment 2

Figure 16:
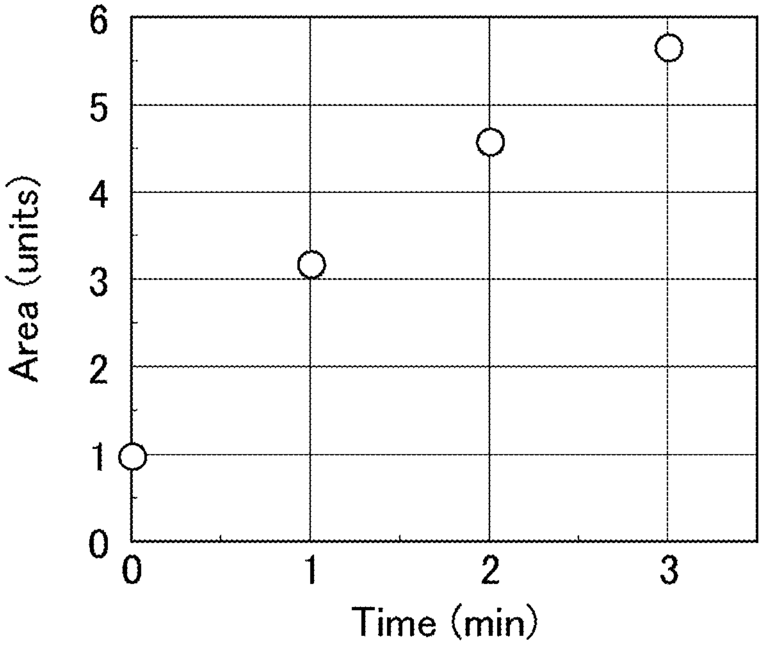
FIG. 16 is a graph of diffusion in the case where a 1% by weight uranine solution was added dropwise to a 20% by volume glycerol aqueous solution and left for three minutes.

In the same measurement system as in Validation Experiment 7, a low molecular weight compound was added dropwise so as to confirm that an image was not maintained. First, to 5 mL of a 20% by volume glycerol aqueous solution was added dropwise 5 μL of a solution of 1% by weight uranine (CAS No. 518-47-8, molecular weight 376) (suspension in a 20% by volume glycerol aqueous solution). FIG. 16 is a graph of diffusion in the case where the 1% by weight uranine solution was added dropwise to the 20% by volume glycerol aqueous solution and left for three minutes. Consequently, as shown in FIG. 16, the uranine was observed to disperse rapidly immediately after the dropwise addition and to diffuse five times or more as large as the initial area after a lapse of three minutes. This demonstrates that a solution of a low molecular weight compound has difficulty in forming an image in a liquid.

Validation Experiment 8

This experiment was performed to verify a satisfactory image was drawn at $U \times L \leq 10^{-3}$ m$^2$/s, wherein L represents the diameter of the nozzle and U represents the speed of the nozzle in a liquid.

First, to control the nozzle speed U and the discharge flow rate of a liquid to be discharged, an actuator (EC-DS3M-150-1-MOT, available from IAI Corp., Japan) and a pump (QI-5-6R-UP-S, available from Tacmina Corp., Japan) were combined to build a discharging device. The nozzles used were a product having an outer diameter of 1 mm and an opening diameter (i.e., nozzle diameter L) of 0.2 mm (PTFE needle TN-0.2-25, available from Iwashita Engineering, Inc.) and a product having an outer diameter of 5 mm and an opening diameter (i.e., nozzle diameter L) of 2 mm (produced by cutting a stainless steel tube having an outer diameter of 5 mm and an inner diameter of 2 mm).

Next, an aqueous suspension of 1-μm diameter polystyrene micro-sized particles (Polystyrene Red Dyed Microsphere 1.00 μm, available from Polysciences Inc.) was suspended in a glycerol aqueous solution having a final concentration of 20% by volume to a final concentration of 0.2% by volume, whereby an ink was prepared.

An aqueous solution used for drawing with a thin nozzle was a 20% by volume glycerol aqueous solution containing 0.5% by weight carboxymethyl cellulose. The viscosity of this aqueous solution for drawing at 25 °C was evaluated using the density measured using a density meter (DMA 4500 M, available from Anton Paar GmbH) and the value from a tuning fork vibro viscometer (SV-10 available from A & D Co., Ltd.). The resulting viscosity was 17 mPa·s and was equal to that of tomato juice.

An aqueous solution used for drawing with a thick nozzle was a 20% by volume glycerol aqueous solution containing 1% by weight carboxymethyl cellulose. The viscosity of this aqueous solution for drawing at 25 °C was evaluated using the density measured using a density meter (DMA 4500 M, available from Anton Paar GmbH) and the value from a tuning fork vibro viscometer SV-10 (available from A & D Co., Ltd.). The resulting viscosity was 58 mPa·s and was equal to that of salad oil.

Nozzles were selected and moved at a variety of nozzle speeds such that the product of the nozzle diameter L and the nozzle speed U (U×L) fell within $0.03 \times 10^{-3}$ m$^2$/s to $1.3 \times 10^{-3}$ m$^2$/s. The ink was discharged into each aqueous solution to draw a line.

The resulting lines were video recorded using iPhone® SE (available from Apple Inc.) and the distortion of each straight line along 40 mm, the length of the line drawn, was visually evaluated. Specifically, a straight line drawn in an aqueous solution may be distorted in a wavy form due to a turbulent flow generated by the drawing operation under some conditions. The maximum length of the amplitude of this wave was measured using image processing software (ImageJ (NIH)) and the measured value was divided by the length of the line, i.e., 40 mm. The resulting value was defined as the percent change (displacement of line).

Figure 17:
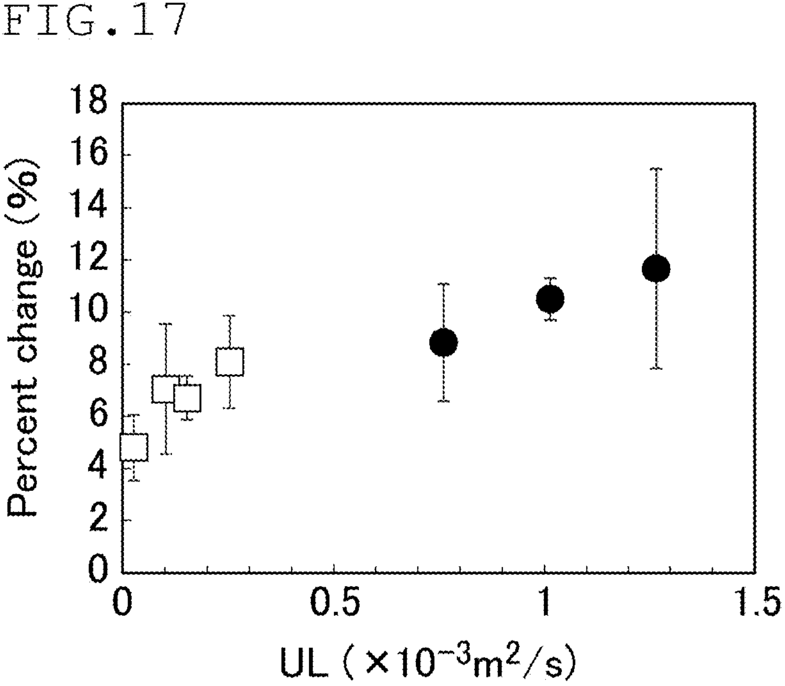
FIG. 17 is a graph of the results of evaluating the line displacements in Validation Experiment 8 where 40-mm-long lines were drawn by discharging a suspension containing 1-μm-diameter micro-sized particles at a concentration of 0.2% by volume into a 20% by volume glycerol aqueous solution containing 0.5% by weight or 1% by wight carboxymethyl cellulose with various nozzle diameters, moving speeds, and discharge flow rates.

FIG. 17 is a graph of the results of evaluating the line displacements in Validation Experiment 8 where 40-mm-long lines were drawn by discharging the suspension containing the 1-μm-diameter micro-sized particles at a concentration of 0.2% by volume into the 20% by volume glycerol aqueous solution containing 0.5% by weight or 1% by wight carboxymethyl cellulose with various nozzle diameters, moving speeds, and discharge flow rates. In FIG. 17, the squares indicate the results with a thin nozzle, while the circles indicate the results with a thick nozzle. Consequently, as shown in 17, the greater the product of U×L is, the higher the percent change is. In the case where the product was $0.7 \times 10^{-3}$ m$^2$/s, the percent change was 10% or lower and a straight line was drawn in the aqueous solution. Also, in the case where the product was $10^{-3}$ m$^2$/s, the percent change was substantially 10% and a straight line was drawn in the aqueous solution. These results are expected to be further improved by increasing the viscosity of an aqueous solution for drawing, in other words, a satisfactory image may be obtained at $U \times L \leq 10^{-3}$ m$^2$/s.

Validation Experiment 9

Evaluated was the ratio ((X/A)/U, rate of speed) of the value obtained by dividing the discharge flow rate X of the pattern-forming material discharged through the nozzle by the opening area A at the distal end of the nozzle to the speed U of the nozzle.

The examination device, ink, and aqueous solution for drawing were the same as those in Validation Experiment 8. The nozzle used was a product having an outer diameter of 1 mm and an inner diameter of 0.2 mm (PTFE needle TN-0.2-25, available from Iwashita Engineering, Inc.). The nozzle speed U was set to 102 mm/s. Specifically, with the following parameters:

$$\text{Speed } U \text{ (m/s) of nozzle} = 102 \times 10^{-3} \text{ m/s; and}$$

$$\text{Opening area } A \text{ (m}^2\text{) of nozzle} = 0.031 \times 10^{-6} \text{ m}^2,$$

the discharge flow rate X satisfying the above Formula 1, i.e., U=X/A was obtained by the following calculation:

$$\text{Discharge flow rate } X \text{ (m}^3\text{/s)} = U \times A = 3.2 \times 10^{-9} \text{ m}^3\text{/s} = 3.2\ \mu L\text{/s} = 192\ \mu L\text{/min.}$$

This discharge flow rate X seems to be the most stable, i.e., the theoretically most preferred discharge flow rate in the present validation experiment.

Since the nozzle speed U and the nozzle opening area A were fixed, the discharge flow rate X was changed to change the rate of speed (X/A)/U. Specifically, taking the most stable discharge flow rate, 192 μL/min, in the present validation experiment as 1, experiments were performed where, on the one hand, the discharge flow rate was increased 10-fold (1916 μL/min) and where, on the other hand, the discharge flow rate was decreased 0.2-fold (38 μL/min). In other words, lines were drawn at various discharge flow rates from 38 μL/min to 1916 μL/min.

The distortions (rates of change) of the resulting lines were evaluated in the same manner as in Validation Experiment 8. Specifically, taking the discharge flow rate 192 μL/min as 1, the relationship between the discharge flow rate and the line distortion was evaluated.

Figure 18:
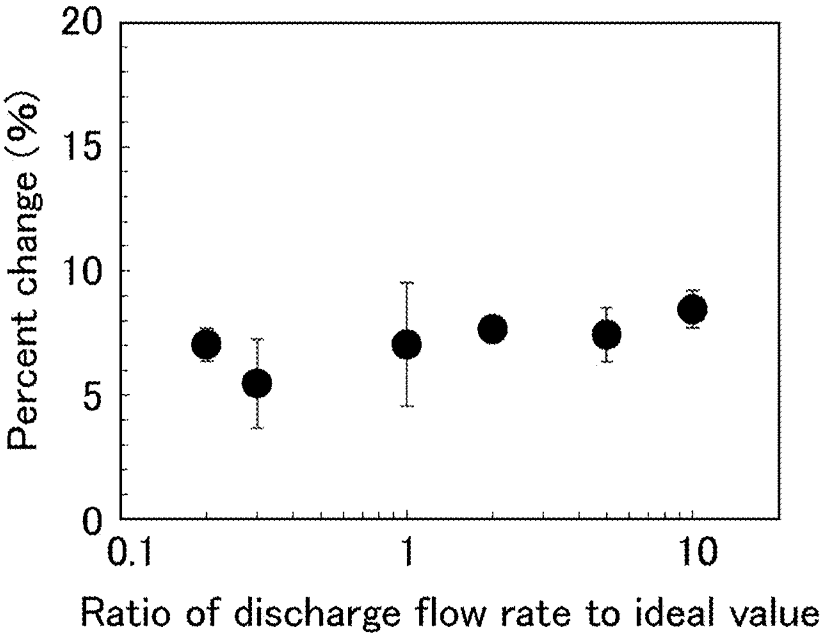
FIG. 18 is a graph of the results of evaluating the line displacements in Validation Experiment 9 where 40-mm-long lines were drawn by discharging a suspension containing 1-μm-diameter micro-sized particles at a concentration of 0.2% by volume into a 20% by volume glycerol aqueous solution containing 0.5% by weight carboxymethyl cellulose with various discharge flow rates.

FIG. 18 is a graph of the results of evaluating the line displacements in Validation Experiment 9 where 40-mm-long lines were drawn by discharging the suspension containing the 1-μm-diameter micro-sized particles at a concentration of 0.2% by volume into the 20% by volume glycerol aqueous solution containing 0.5% by weight carboxymethyl cellulose with various discharge flow rates. Consequently, as shown in FIG. 18, the distortion (percent change) of the line obtained within the range from 0.2 to 10 was 10% or lower, which demonstrates satisfactory drawing.

These results demonstrate that a satisfactory line is drawn when the ratio ((X/A)/U, rate of speed) of the value obtained by dividing the discharge flow rate X of the pattern-forming material discharged through the nozzle by the opening area A at the distal end of the nozzle to the speed U of the nozzle falls within a range from 0.2 to 10.

REFERENCES (Reference 1) The bulletin of Hachinohe Institute of Technology, 2007, Vol. 26, pp. 9-13

REFERENCE SIGNS LIST

10: pattern-forming material
11; micro-sized particles.
12: first liquid
20: second liquid
30: pattern
40: container
100, 200, 300: system for producing pattern-containing liquid
110, 210, 310: tank
120, 220, 320: nozzle
130: pump
140: controller
150, 250: stage
151, 152: liquid delivery tube
260: gantry system
261: x-axial rail
262: z-axial rail
263: z-axial drive motor
264: y-axial rail
265: y-axial drive motor
360: robot arm

The invention claimed is:

1. A method for producing a pattern-containing liquid, comprising:

discharging, using a position-controllable nozzle, a pattern-forming material in which first particles containing a first edible organic substance are dispersed in a first liquid into a second liquid in which second particles containing a second edible organic substance are dispersed in an amount of 0% by volume or more and 74% by volume or less, thereby forming a pattern from the first particles, wherein a diameter of the first and the second particles is 0.13 μm or greater and 1000 μm or smaller, the pattern is formed by discharging the pattern-forming material through the nozzle into the second liquid with the nozzle being placed in the second liquid, such that the pattern maintains its shape and position for at least 10 minutes after the pattern-forming material is discharged in the second liquid.

2. The method for producing a pattern-containing liquid according to claim 1, wherein the first particles constituting the pattern and/or the second particles are not chemically bonded to each other by a crosslinker.

3. The method for producing a pattern-containing liquid according to claim 1, wherein the first particles and/or the second particles aggregate each other in a noncovalent manner to give mouthfeel.

4. The method for producing a pattern-containing liquid according to claim 1, wherein a ratio of a density of the first particles and a ratio of a density of the second particles to a density of the second liquid are each 0.9 or higher and 1.1 or lower, and a ratio of the density of the second liquid to a density of the first liquid is 0.9 or higher and 1.1 or lower.

5. The method for producing a pattern-containing liquid according to claim 1, wherein the first liquid and the second liquid have an absolute difference in moisture content of 0% or greater and 50% or smaller.

6. The method for producing a pattern-containing liquid according to claim 1, wherein the first liquid and the second liquid each have a viscosity of 0.8 mPa·s or higher and 6 Pa·s or lower at 25 °C.

7. The method for producing a pattern-containing liquid according to claim 1, wherein the nozzle satisfies a relationship $U \times L \leq 10^{-3}$ $m^2/s$, wherein L represents a diameter of the nozzle and U represents a speed of the nozzle in the second liquid.

8. The method for producing a pattern-containing liquid according to claim 1, wherein a ratio of a value obtained by dividing a discharge flow rate X of the pattern- forming material discharged through the nozzle by an opening area A at a distal end of the nozzle to a speed U of the nozzle in the second liquid is 0.2 or higher and 10 or lower.

9. The method for producing a pattern-containing liquid according to claim 1, wherein the first liquid remains liquid in the second liquid after the first liquid is discharged into the second liquid.

10. The method for producing a pattern-containing liquid according to claim 1, wherein the first particles in the pattern are present in a diffusible state in the first liquid and the second liquid.

11. The method for producing a pattern-containing liquid according to claim 1, wherein the pattern is formed by diffusion of the first particles in the first liquid and the second liquid, the diffusion of the first particles being limited relative to diffusion of particles that are smaller than the first particles.

* * * * *